(12) United States Patent
Morris et al.

(10) Patent No.: US 12,108,127 B2
(45) Date of Patent: Oct. 1, 2024

(54) SYSTEM AND METHOD OF AUTOMATED MEDIA ASSET SEQUENCING IN A MEDIA PROGRAM

(71) Applicant: HITSBY ENTERTAINMENT INC., Toronto (CA)

(72) Inventors: Andrew Michael Morris, Toronto (CA); Paul Habert, Toronto (CA)

(73) Assignee: HITSBY ENTERTAINMENT INC., Toronto (CA)

( * ) Notice: Subject to any disclaimer, the term of this patent is extended or adjusted under 35 U.S.C. 154(b) by 0 days.

(21) Appl. No.: 18/007,459

(22) PCT Filed: Aug. 2, 2021

(86) PCT No.: PCT/CA2021/000059
§ 371 (c)(1),
(2) Date: Jan. 30, 2023

(87) PCT Pub. No.: WO2022/020934
PCT Pub. Date: Feb. 3, 2022

(65) Prior Publication Data
US 2023/0308732 A1    Sep. 28, 2023

Related U.S. Application Data

(60) Provisional application No. 63/059,347, filed on Jul. 31, 2020.

(51) Int. Cl.
*H04N 7/10*  (2006.01)
*H04N 7/025*  (2006.01)
*H04N 21/8547*  (2011.01)

(52) U.S. Cl.
CPC ............... *H04N 21/8547* (2013.01)

(58) Field of Classification Search
CPC ............. H04N 21/8547; H04N 21/845; H04N 21/2387; H04N 21/242; H04N 21/435;
(Continued)

(56) References Cited

U.S. PATENT DOCUMENTS 6,016,380 A    1/2000 Norton
6,771,285 B1   8/2004 McGrath
(Continued)

OTHER PUBLICATIONS

Soundtrap for Storytellers—Make podcasts online—www_soundtrap_com storytellers—Printed Jun. 11, 2021 2020.
(Continued)

*Primary Examiner* — Gigi L Dubasky
(74) *Attorney, Agent, or Firm* — David Greer; Smart & Biggar LP

(57) ABSTRACT

System and method for processing a media program that comprises multiple tracks, each of the tracks including one or more media assets that are arranged relative to a reference timeline, including computing automation metadata for the media program; receiving a media recording corresponding to a track of the media program, the media recording including one or more replacement media assets to replace corresponding original media assets included on the corresponding track of the media program; generating, based on the automation metadata, playback sequence data that includes a list the original media assets that have not been replaced together with the one or more replacement media assets, the playback sequence data indicating a playback sequence order and playback timecodes that preserve a respective timing of the original and replacement media assets between the media program and a new version of the media program; and rendering, based on the playback synchronization data, the new version of the media program.

20 Claims, 27 Drawing Sheets

(58) Field of Classification Search
CPC ............. H04N 21/439; H04N 21/8106; H04N 21/85406; G10L 15/26
See application file for complete search history.

(56) References Cited

U.S. PATENT DOCUMENTS

| | | | |
|---|---|---|---|
| 6,831,729 | B1 | 12/2004 | Davies |
| 10,445,052 | B2 | 10/2019 | Rubin et al. |
| 10,564,817 | B2 | 2/2020 | Holmes et al. |
| 10,775,877 | B2 | 9/2020 | Mandalia et al. |
| 2006/0064644 | A1 | 3/2006 | Joo |
| 2007/0002902 | A1 | 1/2007 | Hannuksela |
| 2010/0040349 | A1 | 2/2010 | Landy |
| 2011/0026898 | A1 | 2/2011 | Lussier et al. |
| 2012/0116883 | A1* | 5/2012 | Asam ................ G06Q 30/0261 705/14.58 |
| 2012/0201121 | A1 | 11/2012 | Wallace |
| 2012/0301112 | A1* | 11/2012 | Wallace ............... G11B 27/031 386/E5.028 |
| 2015/0220635 | A1* | 8/2015 | Deen .................... G06F 16/739 707/740 |
| 2015/0371679 | A1* | 12/2015 | Oz ........................... H04N 5/76 386/285 |
| 2017/0118523 | A1* | 4/2017 | Gupta .................. H04N 21/278 |
| 2018/0310042 | A1* | 10/2018 | Mayalil ............ H04N 21/41407 |
| 2019/0313135 | A1* | 10/2019 | Pathak ............... H04N 21/8586 |
| 2019/0355024 | A1 | 11/2019 | Han et al. |
| 2020/0007952 | A1* | 1/2020 | Turner ............... H04N 21/4334 |
| 2021/0193148 | A1 | 6/2021 | Kumar et al. |

OTHER PUBLICATIONS

Descript _ All-in-one audio_video editing_ as easy as a doc www_descript_com printed Jun. 11, 2021 2021.

* cited by examiner

Gen2 Script 156

| Gen2 Line Number | Gen2 Character ID | Gen2 Script Text Start ID | Gen2 Script Text End ID | Gen2 Script Text |
|---|---|---|---|---|
| 001 | C2 | C2.01 | C2.02 | I hate these parties. |
| 002 | C1 | C1.01 | C1.02 | Who cares? This is a great chance to see and be seen. |
| 003 | C2 | C2.03 | C2.04 | Hide me. |
| 004 | C3 | C3.01 | C3.02 | Well look who it is! Omar, is that you? |
| 005 | C2 | C2.05 | C2.06 | Oh, hey Mona. So great to see you again. |
| 006 | C1 | C1.03 | C1.04 | I need a drink. |

FIG. 3B

| Gen2 Line Number | Gen2 Character ID | Gen3 Guide Track | Gen2 Media Asset Start ID | Gen2 Media Asset End ID |
|---|---|---|---|---|
| 001 | C2 | Y | C2.01 | C2.02 |
| 002 | C1 | Y | C1.01 | C1.02 |
| 003 | C2 | Y | C2.03 | C2.04 |
| 004 | C3 | Y | C3.01 | C3.02 |
| 005 | C2 | Y | C2.05 | C2.06 |
| 006 | C1 | Y | C1.03 | C1.04 |

Gen3 Script 221

| Gen2 Line Number | Gen2 Character ID | Gen3 Media Asset ID | Gen3 Media Asset Name | Gen3 Guide Track | Gen2 Media Asset Start ID | Gen3 Media Asset Start | Gen2 Media Asset End ID | Gen3 Media Asset End | Gen2 Script Text |
|---|---|---|---|---|---|---|---|---|---|
| 001 | C2 | C2002M | omar_01.wav | Y | C2.01 | 00:00:00:00 | C2.02 | 00:00:02:11 | I hate these parties. |
| 002 | C1 | C1003M | kate_01.wav | Y | C1.01 | 00:00:00:00 | C1.02 | 00:00:04:15 | Who cares? This is a great chance to see and be seen. |
| 003 | C2 | C2005M | omar_02.wav | Y | C2.03 | 00:00:00:00 | C2.04 | 00:00:01:07 | Hide me. |
| 004 | C3 | C3006M | mona_01.wav | Y | C3.01 | 00:00:00:00 | C3.02 | 00:00:04:14 | Well look who it is! Omar, is that you? |
| 005 | C2 | C2008M | omar_03.wav | Y | C2.05 | 00:00:00:00 | C2.06 | 00:00:03:25 | Oh, hey Mona. So great to see you again. |
| 006 | C1 | C1009M | kate_02.wav | Y | C1.03 | 00:00:00:00 | C1.04 | 00:00:01:18 | I need a drink. |

FIG. 7A

Project automation metadata 231

| Marker Number | Marker Class | Marker ID | Triggered By Marker ID | Marker Type | Speech Sync | Program Timecode | Anchor to | Media Asset ID | Media Asset Name | Offset | Time to Next Marker |
|---|---|---|---|---|---|---|---|---|---|---|---|
| 001 | Start | S01 | | Program Start | | 00:00:00:00 | TIMECODE | | | +00:00:00:00 | 00:00:01:00 |
| 002 | Time-Based | T02 | S01 | Audio Start | | 00:00:01:00 | MEDIA ASSET | M1001S | music_fancy-pants_st.wav | +00:00:00:00 | 00:00:01:21 |
| 003 | Asset-Based | F03 | T02 | Trigger Point | | 00:00:02:21 | MEDIA ASSET | M1001S | music_fancy-pants_st.wav | +00:00:01:21 | 00:00:00:00 |
| 004 | Asset-Based | F04 | F03 | Audio Start | | 00:00:02:21 | MEDIA ASSET | C2002M | omar_01.wav | +00:00:00:06 | 00:00:01:26 |
| 005 | Asset-Based | F05 | F04 | Audio End | | 00:00:04:17 | MEDIA ASSET | C2002M | omar_01.wav | +00:00:02:02 | 00:00:00:20 |
| 006 | Phantom | P06 | F05 | Trigger Point | | 00:00:05:07 | DURATION | | | +00:00:00:20 | 00:00:00:00 |
| 007 | Time-Based | T07 | P06 | Audio Start | | 00:00:05:07 | MEDIA ASSET | C1003M | kate_01.wav | +00:00:00:07 | 00:00:04:01 |
| 008 | Asset-Based | F08 | T07 | Audio End | | 00:00:09:08 | MEDIA ASSET | C1003M | kate_01.wav | +00:00:04:08 | 00:00:00:00 |
| 009 | Asset-Based | F09 | F08 | Audio Start | | 00:00:09:08 | MEDIA ASSET | F1004M | door_open_01.wav | +00:00:00:08 | 00:00:02:00 |
| 010 | Phantom | P09 | F09 | Trigger Point | | 00:00:11:08 | DURATION | | | +00:00:02:00 | 00:00:00:00 |
| 011 | Time-Based | T09 | P09 | Audio Start | | 00:00:11:08 | MEDIA ASSET | C2005M | omar_02.wav | +00:00:00:08 | 00:00:00:22 |
| 012 | Asset-Based | F10 | T09 | Audio End | | 00:00:12:00 | MEDIA ASSET | C2005M | omar_02.wav | +00:00:01:00 | 00:00:00:00 |
| 013 | Asset-Based | F11 | F10 | Audio Start | | 00:00:12:00 | MEDIA ASSET | C3006M | mona_01.wav | +00:00:00:15 | 00:00:01:19 |
| 014 | Asset-Based | F12 | F11 | Trigger Point | Y | 00:00:13:19 | MEDIA ASSET | C3006M | mona_01.wav | +00:00:02:04 | 00:00:00:00 |
| 015 | Asset-Based | F13 | F12 | Trigger Point | | 00:00:13:19 | MEDIA ASSET | F2007M | door_close_02.wav | +00:00:00:26 | 00:00:02:00 |
| 016 | Asset-Based | F14 | F12 | Audio End | | 00:00:15:19 | MEDIA ASSET | C3006M | mona_01.wav | +00:00:04:04 | 00:00:00:18 |
| 017 | Phantom | P15 | F14 | Trigger Point | | 00:00:16:07 | DURATION | | | +00:00:00:18 | 00:00:00:00 |
| 018 | Time-Based | T15 | P15 | Audio Start | | 00:00:16:07 | MEDIA ASSET | C2008M | omar_03.wav | +00:00:00:07 | 00:00:03:13 |
| 019 | Asset-Based | F16 | T15 | Audio End | | 00:00:19:20 | MEDIA ASSET | C2008M | omar_03.wav | +00:00:03:20 | 00:00:00:00 |
| 020 | Asset-Based | F17 | F16 | Audio Start | | 00:00:19:20 | MEDIA ASSET | C1009M | kate_02.wav | +00:00:00:05 | 00:00:01:13 |
| 021 | End | E18 | F17 | Program End | | 00:00:21:03 | MEDIA ASSET | C1009M | kate_02.wav | +00:00:01:18 | 00:00:00:00 |

FIG. 7B

Gen3 Asset Metadata 241A (for project Audio File 241)

| Event Number | Gen3 Media Asset ID | Gen2 Character ID | Gen3 Media Asset Name | Gen3 Track ID | Gen2 Guide Track | Gen2 Media Asset Start ID | Gen3 Program Timecode In | Gen2 Media Asset End ID | Gen3 Program Timecode Out | Gen3 Length |
|---|---|---|---|---|---|---|---|---|---|---|
| 001 | M1001S | | music_fancy-pants_st.wav | A5 | | | 00:00:01:00 | | 00:00:12:05 | 00:00:11:05 |
| 002 | C2002M | C2 | omar_01.wav | A2 | Y | C2.01 | 00:00:02:15 | C2.02 | 00:00:04:26 | 00:00:02:11 |
| 003 | C1003M | C1 | kate_01.wav | A1 | Y | C1.01 | 00:00:05:00 | C1.02 | 00:00:09:15 | 00:00:04:15 |
| 004 | F1004M | | door_open_01.wav | A4 | | | 00:00:09:00 | | 00:00:11:16 | 00:00:02:16 |
| 005 | C2005M | C2 | omar_02.wav | A2 | Y | C2.03 | 00:00:11:00 | C2.04 | 00:00:12:07 | 00:00:01:07 |
| 006 | C3006M | C3 | mona_01.wav | A3 | Y | C3.01 | 00:00:11:15 | C3.02 | 00:00:15:29 | 00:00:04:14 |
| 007 | F2007M | | door_close_02.wav | A4 | | | 00:00:12:23 | | 00:00:15:09 | 00:00:02:16 |
| 008 | C2008M | C2 | omar_03.wav | A2 | Y | C2.05 | 00:00:16:00 | C2.06 | 00:00:19:25 | 00:00:03:25 |
| 009 | C1009M | C1 | kate_02.wav | A1 | Y | C1.03 | 00:00:19:15 | C1.04 | 00:00:21:03 | 00:00:01:18 |

FIG. 7C

Metadata Attributes 802

| Gen2 | Gen2 | Gen2 | Gen2 | Gen2 | Gen2 | Gen2 | Gen2 |
|---|---|---|---|---|---|---|---|
| Media Asset ID | Character ID | Media Asset (Audio File) Name | Track ID | File Type | Channels | Bit Depth | Sample Rate (Hz) |
| U1000M | C2 | jordan_omar.wav | A2 | WAV | 1 | 24 | 48000 |

| Gen2 | Gen2 | Gen2 | Gen2 | Gen2 | Gen2 | Gen2 |
|---|---|---|---|---|---|---|
| File Size (kb) | Date Created | Date Uploaded | Time Code Start | Device | User Name | Location |
| 432.5 | 2019-07-04 | 2019-12-04 | 01:00:00:00 | iPhone11 | jordan24 | Toronto, CA |

FIG. 8B

A table of audio files with metadata

| UNIQUE FILE ID | USER | PROJECT | CHARACTER | USER/GUIDE | USER VERSION | RATING |
|---|---|---|---|---|---|---|
| ID.001 | USER-01 | Wizard of Oz | Dorothy | Guide | 1 | 3.9 |
| ID.002 | USER-02 | Wizard of Oz | Tin Man | Guide | 1 | 3.9 |
| ID.003 | USER-03 | Wizard of Oz | Lion | Guide | 1 | 3.9 |
| ID.004 | USER-04 | Wizard of Oz | Scarecrow | Guide | 1 | 3.9 |
| ID.005 | USER-05 | Wizard of Oz | Witch | Guide | 1 | 3.9 | rendered program audio files

| 1 |
|---|
| ID.001 |
| ID.002 |
| ID.003 |
| ID.004 |
| ID.005 |

B

| UNIQUE FILE ID | USER | PROJECT | CHARACTER | USER/GUIDE | USER VERSION | RATING |
|---|---|---|---|---|---|---|
| ID.001 | USER-01 | Wizard of Oz | Dorothy | Guide | 1 | 3.9 |
| ID.002 | USER-02 | Wizard of Oz | Tin Man | Guide | 1 | 3.9 |
| ID.003 | USER-03 | Wizard of Oz | Lion | Guide | 1 | 3.9 |
| ID.004 | USER-04 | Wizard of Oz | Scarecrow | Guide | 1 | 3.9 |
| ID.005 | USER-05 | Wizard of Oz | Witch | Guide | 1 | 3.9 |
| ID.015 | USER-15 | Wizard of Oz | Dorothy | User | 1 | 5.0 |

| 1 | 2 |
|---|---|
| ID.015 | ID.001 |
| ID.002 | ID.002 |
| ID.003 | ID.003 |
| ID.004 | ID.004 |
| ID.005 | ID.005 |

C

| UNIQUE FILE ID | USER | PROJECT | CHARACTER | USER/GUIDE | USER VERSION | RATING |
|---|---|---|---|---|---|---|
| ID.001 | USER-01 | Wizard of Oz | Dorothy | Guide | 1 | 3.9 |
| ID.002 | USER-02 | Wizard of Oz | Tin Man | Guide | 1 | 3.9 |
| ID.003 | USER-03 | Wizard of Oz | Lion | Guide | 1 | 3.9 |
| ID.004 | USER-04 | Wizard of Oz | Scarecrow | Guide | 1 | 3.9 |
| ID.005 | USER-05 | Wizard of Oz | Witch | Guide | 1 | 3.9 |
| ID.015 | USER-15 | Wizard of Oz | Dorothy | User | 1 | 4.5 |
| ID.016 | USER-16 | Wizard of Oz | Tin Man | User | 1 | 4.0 |
| ID.017 | USER-17 | Wizard of Oz | Dorothy | User | 1 | 3.0 |
| ID.018 | USER-18 | Wizard of Oz | Lion | User | 1 | 0.0 |

| 1 | 2 | 3 |
|---|---|---|
| ID.015 | ID.001 | ID.017 |
| ID.016 | ID.002 | ID.002 |
| ID.003 | ID.018 | ID.003 |
| ID.004 | ID.004 | ID.004 |
| ID.005 | ID.005 | ID.005 |

FIG. 13

| Marker Number | Marker ID | Triggered By Marker ID | Marker Type | Speech Sync | Original Marker Timecode | Anchor to | Anchor to Media Asset ID | Anchor to Media Asset Name | Offset | Time to Next Marker | Updated Offset | Updated Time to Next Marker | Updated Marker Timecode |
|---|---|---|---|---|---|---|---|---|---|---|---|---|---|
| 001 | S01 | | Program Start | | 00:00:00:00 | TIMECODE | | | +00:00:00:00 | 00:00:01:00 | +00:00:00:00 | 00:00:01:00 | 00:00:00:00 |
| 002 | T02 | S01 | Audio Start | | 00:00:01:00 | MEDIA ASSET | M1001S | music_fancy-pants_st.wav | +00:00:00:00 | 00:00:01:21 | +00:00:00:00 | 00:00:01:21 | 00:00:01:00 |
| 003 | F03 | T02 | Trigger Point | | 00:00:02:21 | MEDIA ASSET | M1001S | music_fancy-pants_st.wav | +00:00:01:21 | 00:00:00:00 | +00:00:01:21 | 00:00:00:00 | 00:00:02:21 |
| 004 | F04 | F03 | Audio Start | | 00:00:02:21 | MEDIA ASSET | C2002M | omar_01.wav | +00:00:00:06 | 00:00:01:26 | +00:00:00:20 | 00:00:02:15 | 00:00:02:21 |
| 005 | F05 | F04 | Audio End | | 00:00:04:17 | MEDIA ASSET | C2002M | omar_01.wav | +00:00:02:02 | 00:00:00:20 | +00:00:03:05 | 00:00:00:20 | 00:00:05:06 |
| 006 | P06 | F05 | Trigger Point | | 00:00:05:07 | DURATION | | | +00:00:00:20 | 00:00:00:00 | +00:00:00:20 | 00:00:00:00 | 00:00:05:26 |
| 007 | T06 | P06 | Audio Start | | 00:00:05:07 | MEDIA ASSET | C1003M | kate_01.wav | +00:00:00:07 | 00:00:04:01 | +00:00:00:07 | 00:00:04:01 | 00:00:05:26 |
| 008 | F07 | T06 | Audio End | | 00:00:09:08 | MEDIA ASSET | C1003M | kate_01.wav | +00:00:04:08 | 00:00:00:00 | +00:00:04:08 | 00:00:00:00 | 00:00:10:03 |
| 009 | F08 | F07 | Audio Start | | 00:00:09:08 | MEDIA ASSET | F1004M | door_open_01.wav | +00:00:00:08 | 00:00:02:00 | +00:00:00:08 | 00:00:02:00 | 00:00:10:03 |
| 010 | P09 | F08 | Trigger Point | | 00:00:11:08 | DURATION | | | +00:00:02:00 | 00:00:00:00 | +00:00:02:00 | 00:00:00:00 | 00:00:12:03 |
| 011 | T09 | P09 | Audio Start | | 00:00:11:08 | MEDIA ASSET | C2005M | omar_02.wav | +00:00:00:08 | 00:00:00:22 | +00:00:00:20 | 00:00:01:10 | 00:00:12:03 |
| 012 | F10 | T09 | Audio End | | 00:00:12:00 | MEDIA ASSET | C2005M | omar_02.wav | +00:00:01:00 | 00:00:00:00 | +00:00:02:00 | 00:00:00:00 | 00:00:13:13 |
| 013 | F11 | F10 | Audio Start | | 00:00:12:00 | MEDIA ASSET | C3006M | mona_01.wav | +00:00:00:15 | 00:00:01:19 | +00:00:00:15 | 00:00:01:19 | 00:00:13:13 |
| 014 | F12 | F11 | Trigger Point | Y | 00:00:13:19 | MEDIA ASSET | C3006M | mona_01.wav | +00:00:02:04 | 00:00:00:00 | +00:00:02:04 | 00:00:00:00 | 00:00:15:02 |
| 015 | F13 | F12 | Trigger Point | | 00:00:13:19 | MEDIA ASSET | F2007M | door_close_02_.wav | +00:00:00:26 | 00:00:02:00 | +00:00:00:26 | 00:00:02:00 | 00:00:15:02 |
| 016 | F14 | F12 | Audio End | | 00:00:15:19 | MEDIA ASSET | C3006M | mona_01.wav | +00:00:04:04 | 00:00:00:18 | +00:00:04:04 | 00:00:00:18 | 00:00:17:02 |
| 017 | P15 | F14 | Trigger Point | | 00:00:16:07 | DURATION | | | +00:00:00:18 | 00:00:00:00 | +00:00:00:18 | 00:00:00:00 | 00:00:17:20 |
| 018 | T15 | P15 | Audio Start | | 00:00:16:07 | MEDIA ASSET | C2008M | omar_03.wav | +00:00:00:07 | 00:00:03:13 | +00:00:00:20 | 00:00:04:15 | 00:00:17:20 |
| 019 | F16 | T15 | Audio End | | 00:00:19:20 | MEDIA ASSET | C2008M | omar_03.wav | +00:00:03:20 | 00:00:00:00 | +00:00:05:05 | 00:00:00:00 | 00:00:22:05 |
| 020 | F17 | F16 | Audio Start | | 00:00:19:20 | MEDIA ASSET | C1009M | kate_02.wav | +00:00:00:05 | 00:00:01:13 | +00:00:00:05 | 00:00:01:13 | 00:00:22:05 |
| 021 | E18 | F17 | Program End | | 00:00:21:03 | MEDIA ASSET | C1009M | kate_02.wav | +00:00:01:18 | 00:00:00:00 | +00:00:01:18 | 00:00:00:00 | 00:00:23:18 |

FIG. 15A

| Event Number | Original Media Asset ID | Original Media Asset (Audio File) Name | Character ID | Track ID | Original Timecode In | Original Timecode Out | Original Length | Destination Media Asset ID | Destination Media Asset (Audio File) Name | Destination Timecode In | Destination Timecode Out | Destination Length |
|---|---|---|---|---|---|---|---|---|---|---|---|---|
| 001 | M1001S | music_fancy-pants_st.wav | | A5 | 00:00:01:00 | 00:00:12:05 | 00:00:11:05 | M1001S | music_fancy-pants_st.wav | 00:00:01:00 | 00:00:12:05 | 00:00:11:05 |
| 002 | C2002M | omar_01.wav | C2 | A2 | 00:00:02:15 | 00:00:04:26 | 00:00:02:11 | U1000M.01 | jordan_omar_01.wav | 00:00:02:01 | 00:00:05:26 | 00:00:03:25 |
| 003 | C1003M | kate_01.wav | C1 | A1 | 00:00:05:00 | 00:00:09:15 | 00:00:04:15 | C1003M | kate_01.wav | 00:00:05:19 | 00:00:10:04 | 00:00:04:15 |
| 004 | F1004M | door_open_01.wav | | A4 | 00:00:09:00 | 00:00:11:16 | 00:00:02:16 | F1004M | door_open_01.wav | 00:00:09:25 | 00:00:12:11 | 00:00:02:16 |
| 005 | C2005M | omar_02.wav | C2 | A2 | 00:00:11:00 | 00:00:12:07 | 00:00:01:07 | U1000M.02 | jordan_omar_02.wav | 00:00:11:13 | 00:00:14:03 | 00:00:02:20 |
| 006 | C3006M | mona_01.wav | C3 | A3 | 00:00:11:15 | 00:00:15:29 | 00:00:04:14 | C3006M | mona_01.wav | 00:00:12:28 | 00:00:17:12 | 00:00:04:14 |
| 007 | F2007M | door_close_02.wav | | A4 | 00:00:12:23 | 00:00:15:09 | 00:00:02:16 | F2007M | door_close_02.wav | 00:00:14:06 | 00:00:16:22 | 00:00:02:16 |
| 008 | C2008M | omar_03.wav | C2 | A2 | 00:00:16:00 | 00:00:19:25 | 00:00:03:25 | U1000M.03 | jordan_omar_03.wav | 00:00:17:00 | 00:00:22:25 | 00:00:05:25 |
| 009 | C1009M | kate_02.wav | C1 | A1 | 00:00:19:15 | 00:00:21:03 | 00:00:01:18 | C1009M | kate_02.wav | 00:00:22:00 | 00:00:23:18 | 00:00:01:18 |

Gen 3 Asset Metadata 241A for Project

Updated Asset Metadata 1514

FIG. 15B

SYSTEM AND METHOD OF AUTOMATED MEDIA ASSET SEQUENCING IN A MEDIA PROGRAM

RELATED APPLICATIONS

This application claims the benefit of and priority to U.S. Provisional Patent Application No. 63/059,347 filed Jul. 31, 2020, entitled System and Method of Automating the Sequencing of Media Assets in a Program Using Relative Asset Metadata as Triggers for Each Following Event, the contents of which are incorporated herein by reference.

TECHNICAL FIELD

The present disclosure relates to a system and method for processing digital media assets, and in particular a system and method of automating the sequencing of media assets in a media program.

BACKGROUND OF THE INVENTION

In the media production industry, whether producing a video program or an audio program, programs are generally created by means of assembling a sequence of media assets, which include video files such as video recordings, photos, animations, and transition effects; audio files such as recorded dialogue, narration, music, and sound effects; special effects that are applied to the audio and video files; and additional assets added after the program is packaged, which includes accessibility features such as audio description and closed captioning. The sequencing of media assets occurs within a timeline, such that each media asset or "event" is triggered by a point on the timeline, referred to as a timecode or timestamp. Events are commonly assembled among tracks displayed via a user interface, enabling the user to assign similar assets in an orderly fashion along the timeline, as known in the art. The resulting sequential ordering is commonly referred to as an Edit Decision List, which can then be applied by a mixing operation to generate a rendered program that is suitable for distribution to end users.

The problem with a time-based or absolute sequencing system is that the modification of the timing of any event has a ripple effect on every asset following the modified event. An example is the case where a section of dialogue with a duration of fifty seconds needs to be replaced in a program because it was performed too quickly. An updated version of the dialogue is recorded, but because it was performed slower, the duration the new recording is fifty-eight seconds. Since the new recording is eight seconds longer than the previous recording, all the media assets following the new dialogue recording must be moved eight seconds later to accommodate the updated duration of the dialogue section.

It has become standard industry practice to be constantly moving media assets around in post-production based on timing, pacing, musicality, asset replacements, and the like, throughout the process of creating a final program. However, with all systems and procedures in the industry relying on a manually operated, timecode-based software, the potential to automate the sequencing of events in the current state is not practical. Existing solutions that require manual human intervention can be appropriate in situations where there are a limited number of updated media assets. However, such solutions are not appropriate in situations where a large number of media asset versions are available, including for example Web-based environments where multiple different users can be encouraged to submit their own versions of media assets for inclusion in a larger program production.

As another example, in the case where a producer or casting director is to audition talent for an upcoming movie, auditions typically consist of solo performances or performances with a partner who reads the other character's lines. Only much later in the casting process do all the selected actors come together to perform in a group for their compatibility to be assessed.

Accordingly, there is a need for a media sequencing system that enables a sequenced set of media assets to be automatically updated when media assets within the sequence are replaced with media assets having different durations. Such a system may, for example, enable a program producer or editor to review multiple different options for media assets in the context of a fully-compiled program, regardless of the pacing of each individual media asset performance, and swap media assets with minimal effort.

SUMMARY OF THE INVENTION

According to a first example aspect, a system and method of using a relative, trigger-based sequencing system for media assets is deployed to automate the generation of multiple versions of a media program. In some examples, such a system enables multiple different versions of a program to be automatically and efficiently rendered, with each program version including a different combination of media tracks.

According to an example aspect of the disclosure is an automated computer implemented method for processing a media program that comprises multiple tracks, each of the tracks including one or more media assets that are arranged relative to a reference timeline, the method comprising: computing automation metadata for the media program that includes, for each of the original media assets, timecode data indicating relative playback timing for a sequence of the original media assets; receiving a media recording corresponding to a track of the media program, the media recording including one or more replacement media assets to replace corresponding original media assets included on the corresponding track of the media program; computing media recording metadata for the received media recording that includes, for each of the one or more replacement media assets, timecode data indicating a duration of the replacement media asset; generating, based on the automation metadata and the media recording metadata, playback sequence data that includes a list the original media assets that have not been replaced together with the one or more replacement media assets, the playback sequence data indicating a playback sequence order and playback timecodes that preserve a respective timing of the original and replacement media assets between the media program and a new version of the media program; and rendering, based on the playback synchronization data, the new version of the media program.

DESCRIPTION OF THE DRAWINGS

Example embodiments are described below with reference to the following Figures which are intended to provide illustrative, and not exhaustive, examples of systems and methods of the present disclosure:

FIG. 3B shows an example of a Gen2 script metadata file.

FIG. 5B shows an example of basic metadata attributes for media assets.

FIG. 7A shows an example of a Gen3 script metadata file.

FIG. 7B shows an example of a project automation metadata file.

FIG. 7C shows an example of Gen3 asset metadata attributes.

FIG. 8B shows an example of metadata attributes generated for a user recording.

FIG. 13 illustrates tables of media file metadata and resulting rendered program versions.

FIG. 15A shows an example of automation metadata updates for a project version.

FIG. 15B shows an example of Gen3 asset metadata attribute updates that can be applied to generate a new rendered program.

DESCRIPTION

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete.

Figure 1A:
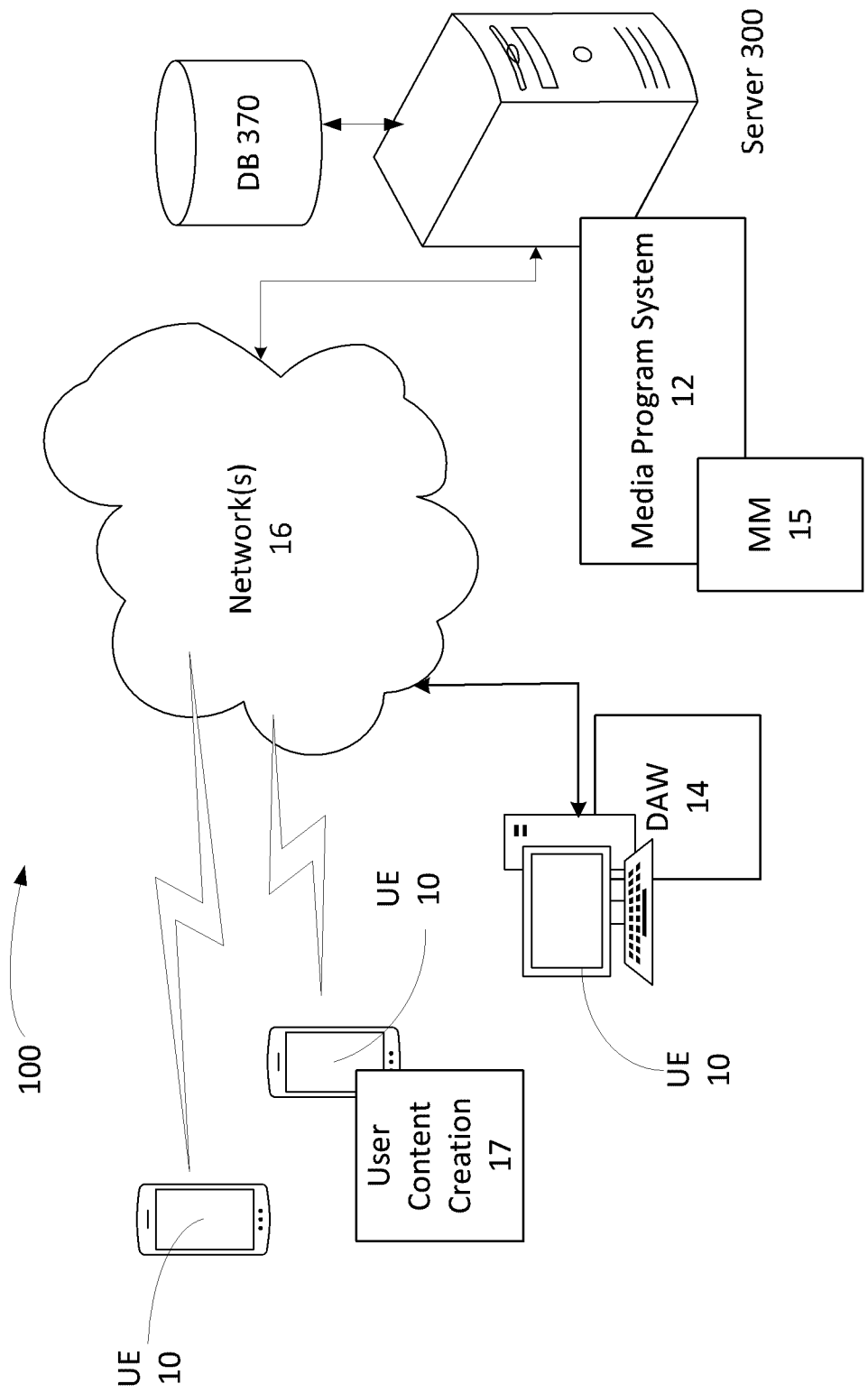
FIG. 1A is a block diagram of an environment in which a system for automating the sequencing of media assets may be implemented in accordance with one embodiment of the present disclosure.

FIG. 1A is a block diagram of a network environment that includes a media asset synchronization system 100 in accordance with one embodiment of the present disclosure. As illustrated, the synchronization system 100, which may for example be used to produce multiple versions of a media program, comprises one or more user equipment (UE) devices 10 and a server system 300. UE devices 10 and server system 300 are configured to communicate with one or more communication networks 16 that can include the Internet. UE devices 10 can for example include mobile communications devices (e.g., smart phones and other smart mobile devices), laptop computer devices, personal computer devices, tablet computer devices, and workstations, among other types of processor enabled devices.

As will be explained in greater detail below, in example embodiments, the synchronization system 100 enables individual users, associated with UE devices 10, to generate and upload media assets to a server 300 that hosts a media program system 12. Server 300 may, for example, be a cloud based server that provides software as a service. Media program system 12 is configured to integrate one or more new media assets to generate a new version of a media program that includes a combination of existing media assets and the new media assets. Media program system 12 is configured to automatically synchronize timing data for the existing and integrated media assets, enabling large numbers of different permutations and combinations of new media assets and existing media assets to be included in different rendered program versions without manual update editing, while preserving the relative timing of Media assets.

Figure 1B:
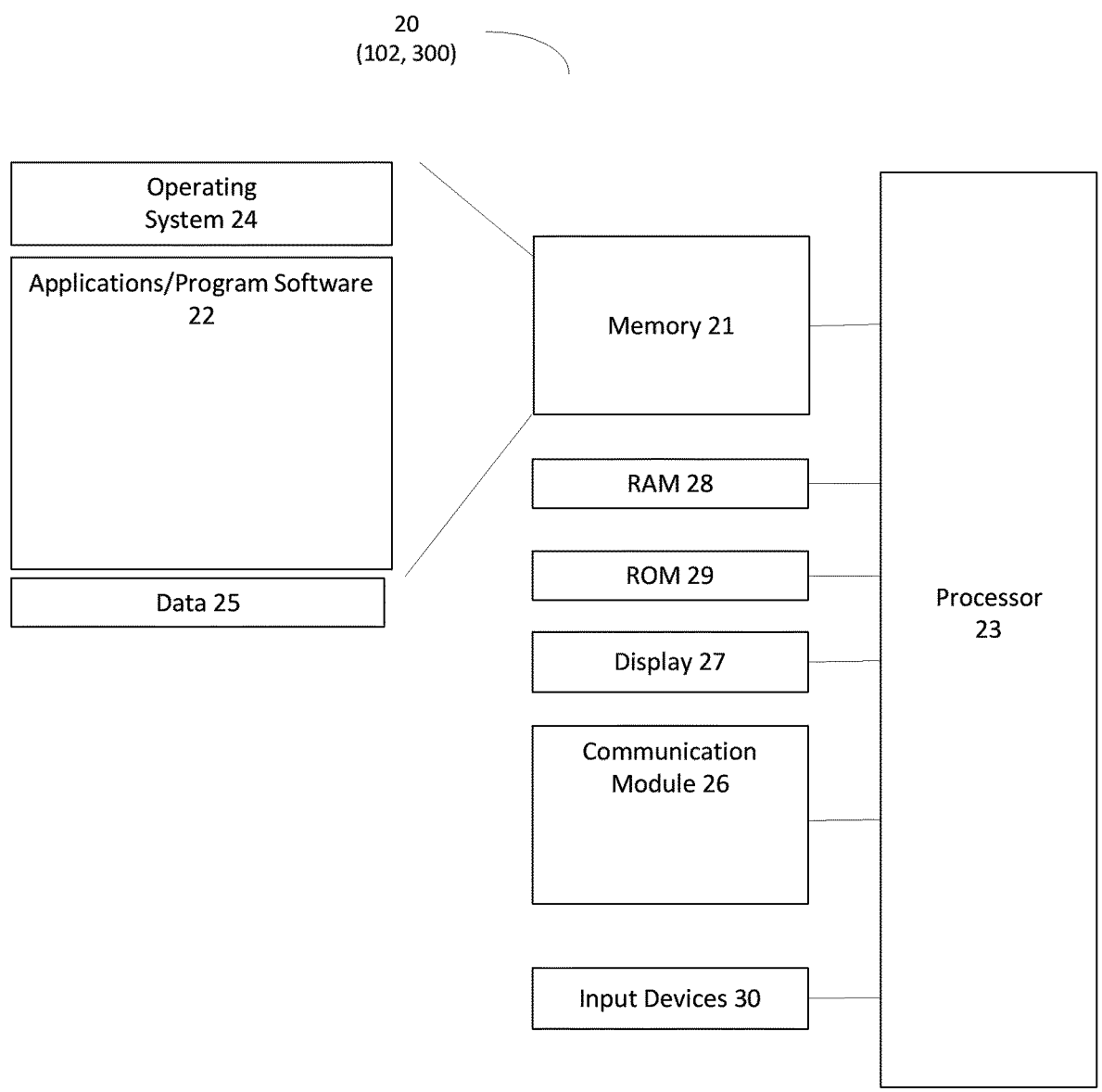
FIG. 1B is a block diagram of a computing device suitable for use in implementing aspects of the system for automating the sequencing of media assets.

FIG. 1B illustrates a simplified block diagram of processor enabled device 20 that could, in example embodiments, be used to implement a UE device 10 or server 300. The device 20 includes a controller comprising at least one processor 23 which controls the overall operation of the device 200. The processor 23 is coupled by an internal circuit to a plurality of components that can include, among other components: RAM 28, ROM 29, a persistent (non-volatile) memory 21 which may be flash EPROM ("flash memory"), a solid state drive (SSD), hard disk drive (HDD), or other suitable form of memory, a display 27, and one or more communication modules 26 for supporting wired and/or wireless communication with network(s) 16. Device 20 may also include one or more input device(s) 30 (such as a keyboard or keypad, touchscreen display components, one or more buttons, one or more switches, a touchpad, a microphone, or other type of input device) and one or more output devices (e.g. speaker, hard wired or wireless audio signal output, and/or vibration device).

Operating system software 24 executed by the processor 23 is stored in the persistent memory 21, but may be stored in other types of memory devices, such as ROM 29 or similar storage element. System software, software modules, specific device applications, or parts thereof, may be temporarily loaded into a volatile store, such as RAM 28, which is used for storing runtime data variables and other types of data or information. Communication signals received by the device 20 may also be stored in the RAM 28. Although specific functions are described for various types of memory, this is merely one example, and a different assignment of functions to types of memory may be used in other embodiments.

The processor 23, in addition to its operating system functions, enables execution of software programs (e.g., applications 22) on the processing device 20. Applications/ software programs that control device operations may be installed on the processing device 20 during manufacture and/or subsequently downloaded and installed via communication module 26. The persistent memory 21 includes installed applications/software programs and user data, such as saved files, among other data. These installed applications/software programs can be executed by one or more processors 23 to implement modules. As used here, a "module" can refer to a combination of a hardware processing circuit (e.g., processor 23) and machine-readable instructions (applications/software programs and/or firmware) executable on the hardware processing circuit.

Figure 2A:
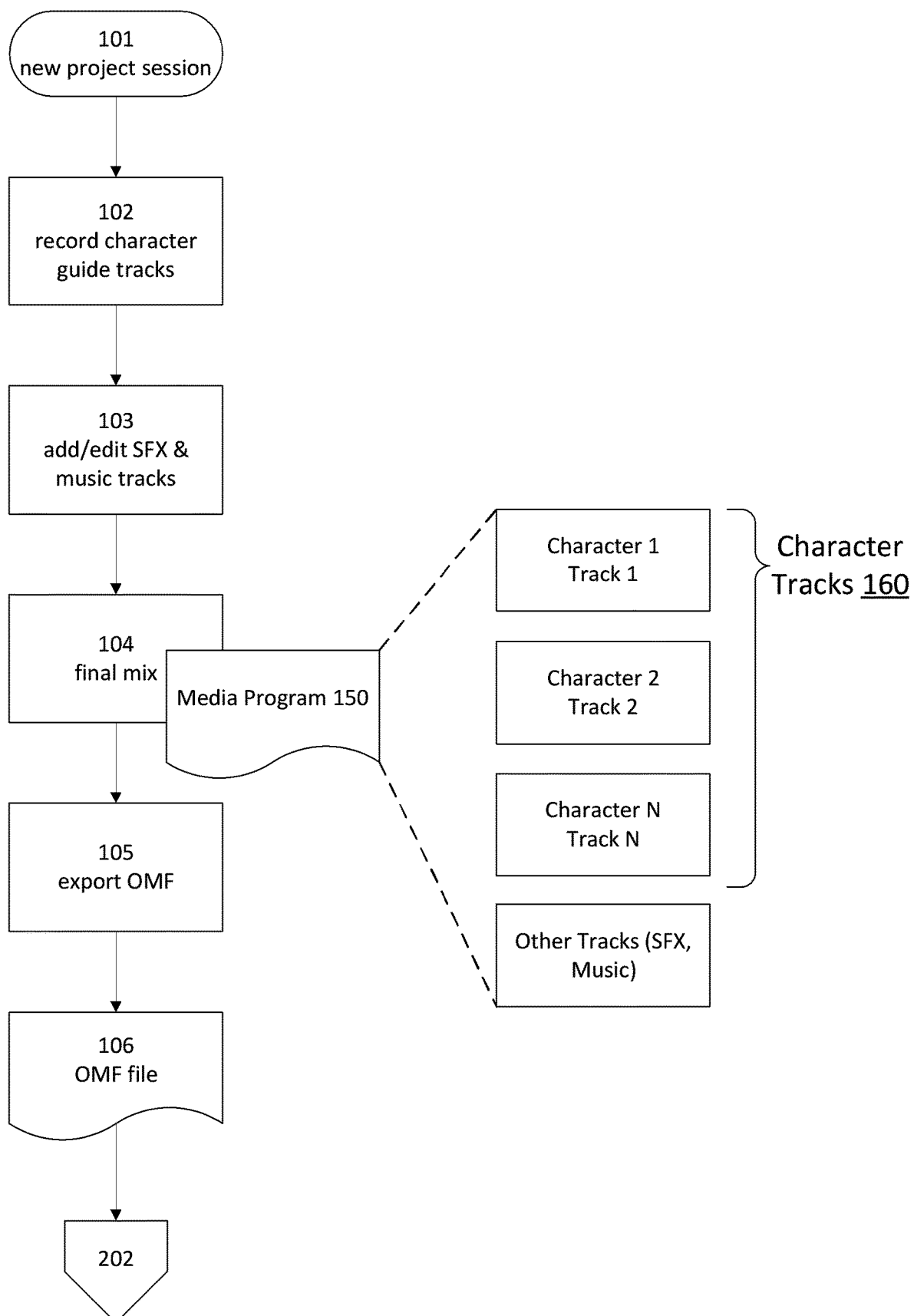
FIG. 2A shows an example of a typical workflow for generating a new media program that includes guide tracks for a new project.

FIG. 2A illustrates an example of a workflow for producing a media program (Media Program) 150 that incorporates multiple tracks. In example embodiments, Media Program 150 functions as a guide or original program that can be used the basis for generating one or more alternative media program versions. Examples will be described in the context of an audio program, although the systems and methods of the present disclosure can also be applied to other types of multi-track media programs such as audio-visual programs. By way of non-limiting examples, examples of audio programs can include podcasts, audiobooks, theatrical audio plays, radio plays, instructional audios, and language training audio programs. Some or all of the workflow of FIG. 2A may for example be implemented using a digital audio workstation (DAW) module 14 that is present on a UE device 10 or hosted on server 300.

A user, for example an audio producer (Producer), may use DAW 14 to create and complete an audio program (e.g., Media Program 150). For example, the Producer can interact with DAW 14 to create a new project session (Session) [Block 101]. During the project session, multiple audio tracks that can include recorded dialogue of multiple characters, sound effects and music are assembled collectively on a timeline. Typically, the dialogue is recorded first [Block 102]. The present disclosure provides an illustrative example of an audio project in which the dialogue includes interactions between three characters (Characters). The dialog of each Character is recorded as a respective character track 160 (Character Track), and the respective Character Tracks are assembled on a project timeline as three separate tracks, each track containing one Character's lines. Each Character Track includes digital audio waveform data that encodes the audio dialog of its respective character. In each character track, each Character dialog line corresponds to a discrete Media Asset, as described in greater detail below. As will also be explained in greater detail below, the recorded Character Tracks are used later in the process as Character Guide Tracks to which other User Recordings (defined below) of the same Character will be compared.

Once the dialogue is edited to the Producer's satisfaction, sound effects (SFX) and music are added to the Session [Block 103] and edited as known in the art. All the audio recordings in the Session are then mixed together as known in the art [Block 104] to create Media Program 150. Media Program 150 incorporates multiple audio tracks including the Character Tracks, which can be used as a basis for a template (Program Template) as described below that can enable audio recording tracks (e.g., Character Tracks) within the Media Program 150 to be replaced with other audio recordings at a later time.

In the illustrated example, the Media Program 150 is exported or converted [Block 105] to a standard interchange file 106, such as an Open Media Framework (OMF) or Advanced Authoring Format (AAF) file, such that the Program 150 can be imported into other systems. (An OMF file is an audio file saved in a standard audio/video format based on the Open Media Framework Interchange, a standardized interchange file format. It may be exported from digital video editing or DAW software and is commonly used to share project data between multiple applications. An AAF file is an Advanced Authoring Format file, which contains complex multimedia information like video and audio clips, as well as metadata information for that content and project). By way of example, an OMF file 106 is considered in the presently illustrated example. The exported OMF file 106 is then ready to be imported into another DAW or other media processing system.

Figure 2B:
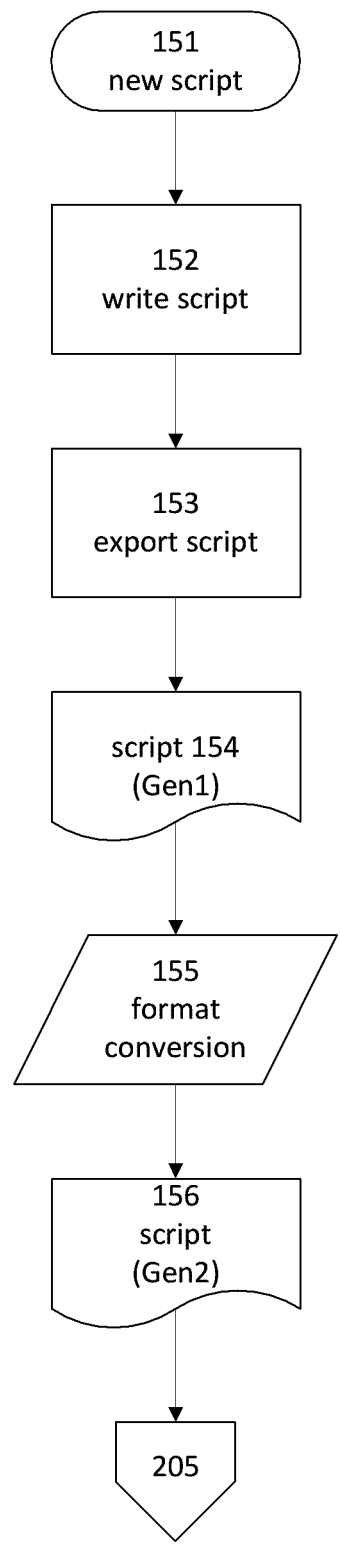
FIG. 2B shows an example of a typical workflow for preparing a script in a format that can be read by a sequencing system according to example embodiments.

In illustrated examples, the audio dialog that is used to generate the Program is based on a script that includes lines for each of the characters. FIG. 2B illustrates the general steps involved in a workflow to create a new script for a Program (such as Media Program 150) or to edit an existing script. Parts of the workflow of FIG. 2B may for example be implemented using a standard screenwriting software (Screenwriting Software) module that runs on a UE device 10 or is hosted by server 300.

Figure 3A:
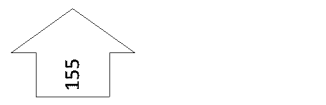
FIG. 3A illustrates an example of a script format conversion operation from Gen1 Script to a Gen2 script.

The Screenwriting Software can be used by a user, for example a Writer, to create a new script project [Block 151] or to write a new script or edit an existing script [Block 152]. In example embodiments, once writing of a new script or editing of an existing script is complete, the completed script data is then exported [Block 153] to a standard script format, resulting in a Script 154, which is in a file format that can be imported into any suitable screenwriting software or text processing software module. For purposes of this description, Script 154 contains what is referred to as first generation metadata (Gen1). Gen1 metadata, an example of which is shown in FIG. 3A, consists of basic file information that was generated from the source, in this case being the Screenwriting Software. This can include for example names of characters and the script text spoken by such characters in a sequential order.

In example embodiments, a script format conversion operation [Block 155] is used to convert the Gen1 Script 154 into a custom format Gen2 Script 156 that contains embedded metadata (referred to herein as Gen2 metadata) that enables individual script elements (e.g., individual dialog lines) to be identified with metadata.

In example embodiments, script format conversion operation [Block 155] can be performed using an automated Conversion Software module that may be present on a UE device 10 or hosted on server 300. The Conversion Software module could be a stand-alone module, or could be a function that occurs from within the screenwriting software used to generate the Gen1 Script 154, for instance as a format conversion option or "plug-in", and/or as a function that is supported by a metadata management (MM) module 15 that is part of the server hosted media program system 12.

A visual sample of the conversion of Gen1 Script 154 into Gen2 Script 156 is illustrated in FIG. 3A, and a representation of metadata for a Gen2 Script 156 in a worksheet file format is shown in FIG. 3B. As indicated in FIGS. 3A and 3B, script format conversion operation [Block 155] performs a task of creating a respective set of Gen2 metadata attributes 180 for each line of dialog. A line of dialog refers to a continuous, uninterrupted audio dialog of a single character. Further, as will be described below, each line of dialog corresponds to a discrete "media asset". The set of Gen2 metadata attributes 180 can include: (1) Line Number, which is a sequential index for the relative location of each line of dialog within the Program; (2) Character ID, which is a unique ID assigned to each character (e.g., Omar Character ID=C2, KATE Character ID=C1 and MONA Character ID=C3 in the illustrated example); (3) Script Text Start ID, which corresponds to a Start Tag that indicates a start reference value for the dialog line, in the format of (CharacterID.Character Specific Counter Value); (4) Script Text End ID, which corresponds to an End Tag that indicates an end reference value for the dialog line, in the format of (CharacterID.Character Specific Counter Value); and (5) Script Text, which is the actual dialog line text. The Character Specific Counter Value is a Character specific index that indicates an order that a character's lines appear relative to other lines of that same character, and corresponds to a current value of a respective Character Specific Counter that is incremented by one every time a new Script Text Start ID or new Script Text End ID is added to the metadata. For example, in the case of Line 001, spoken by Character ID=C2 (Omar), the Script Text Start ID is set to "C2.01". For the corresponding Line 1 Script Text End ID, the Character Specific Counter for Omar is incremented by one, and the Script Text End ID is set to "C2.02". There is an intervening dialog line by another character before the next line (i.e., Line 003) that is spoken by Character ID=C2 (Omar). For the Script Text Start ID of line 3, the Character Specific Counter for Omar is incremented by 1, and the Script Text Start ID of line 3 set to "C2.03" where "03" corresponds to the current value of the Character Specific Counter for Omar (rather than Line 003). For the corresponding Line 3 Script Text End ID, the Character Specific Counter for Omar is incremented by one, and the Script Text End ID is set to "C2.04". Thus, in the example shown, [C2.01] represents the beginning of Character 2's (Omar's) first line; [C2.02] represents the end of Omar's first line; [C1.01] represents the beginning of Character 1's (Kate's) first line; and so on.

In examples, the metadata attributes 180 can include additional data, for example, that pertains to the project, character, timing, positioning, size and/or other useful metadata. In some examples, some or all of this information can be embedded as part of the Script Text Start ID or Script Text End ID. As described below, the Script Text Start ID and Script Text End ID can be used to generate Tags for purposes of aligning script elements (i.e., Script Text dialog lines) with audio elements (e.g., media assets).

Figure 4A:
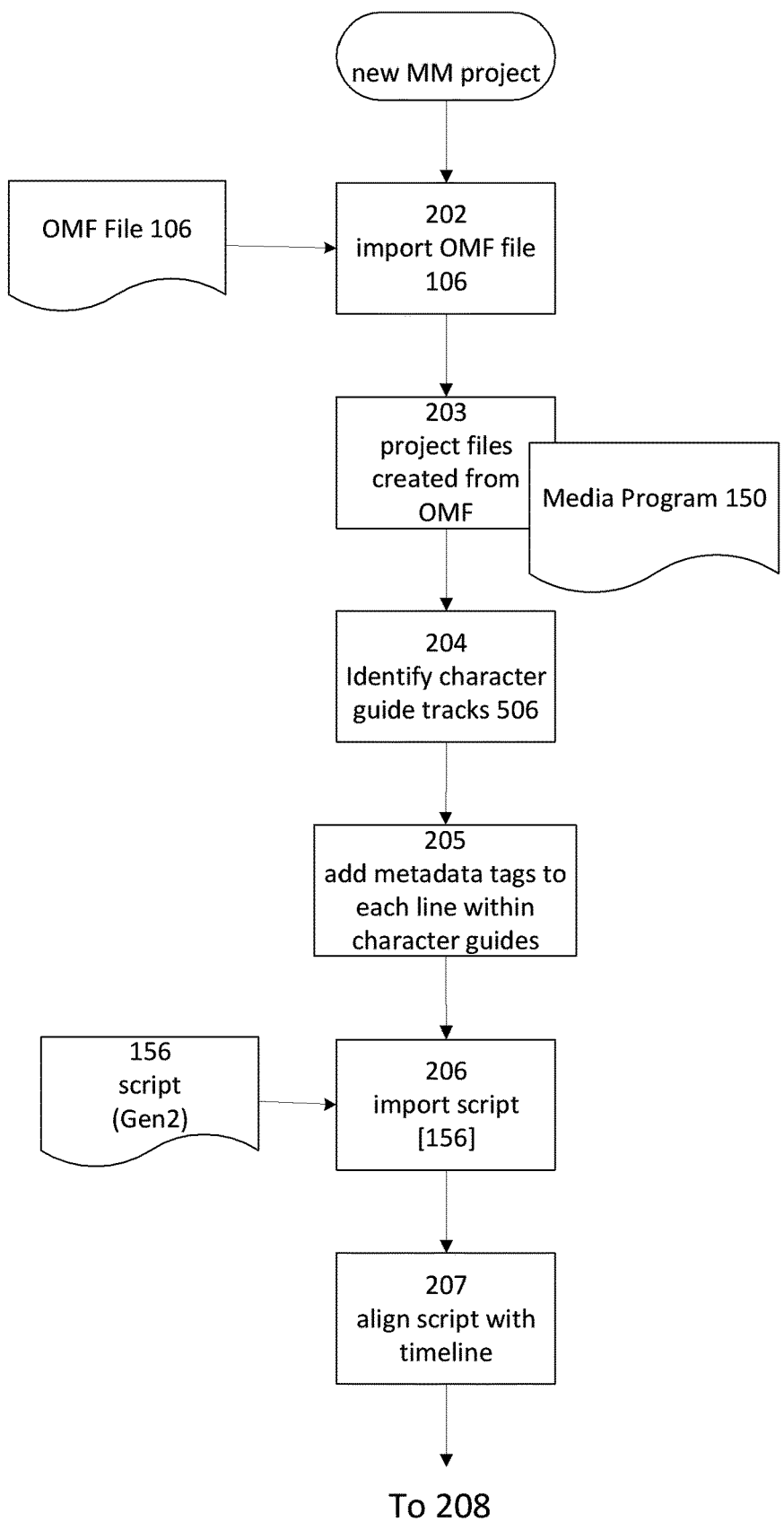
FIGS. 4A and 4B illustrate a workflow to generate trigger-based sequencing instructions according to example embodiments.
Figure 4B:
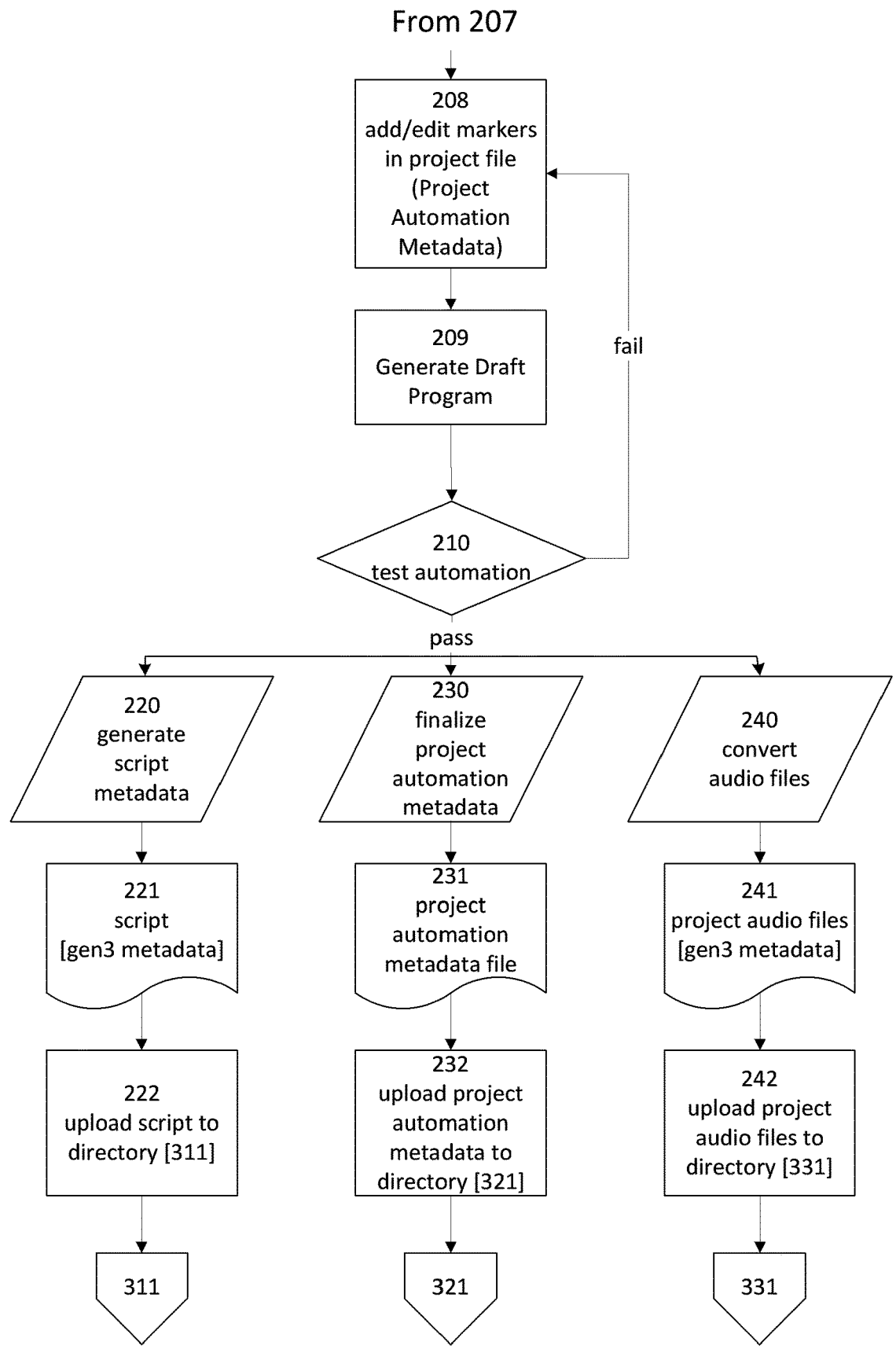

According to example embodiments, project automation metadata 231 is generated for each Media Program 150. As will be explained in greater detail below, project automation metadata 231 comprises a set of Markers that are anchored to Media Assets and have attributes that indicate among other things, the relative timing of Media Assets for the Media Program 150. Project automation metadata 231 that is generated in respect of a Guide Media Program 150 provides a set of sequencing data that can be used to generate new versions of the Media Program 150 that incorporate different media assets than the original Media Program 150. FIGS. 4A and 4B illustrate a process 400 of creating project automation metadata 231, including: (1) tags (Tags), which form the basis by which an original dialogue recording (e.g., corresponding to one of the Character Tracks 160) can be later matched with and replaced by new media recording such as a new user dialogue recording (User Recording), and (2) a sequence of automation markers (Markers), which form the basis from which a completed audio program can be assembled automatically. In some examples, the process 400 of FIGS. 4A and 4B is a function supported by metadata management (MM) module 15 that is part of the server hosted media program system 12. In some examples, process 400 could be integrated as a plug-in into an existing media editing system, including for example as part of a DAW software module.

In an example embodiment, a media file (e.g., standard interchange file that embeds the Media Program 150, such as OMF file 106 generated by the process of FIG. 2A) is imported [Block 106]. By way of example, OMF file 106 may be received by the server 300 hosting MM module 15 through the network 16 from a program creator's UE device 10. Once imported, the OMF file 106 is unpacked to recover Media Program 150. In this regard, any audio files (for example .wav or other audio format files) that are included in the OMF file 106 are automatically extracted from the OMF file 106, organized in tracks that correspond to how they appeared when created at the DAW module 14, thereby creating a new project file (Project) [Block 203] that corresponds to the Media Program 150. The process actions of Blocks 202 and 203 can be performed using methods known in the art, and generate a copy of the Program 150 as generated by the original DAW module 14 session, with all the audio files intact, enabling further processing by the MM module 15.

Figure 5A:
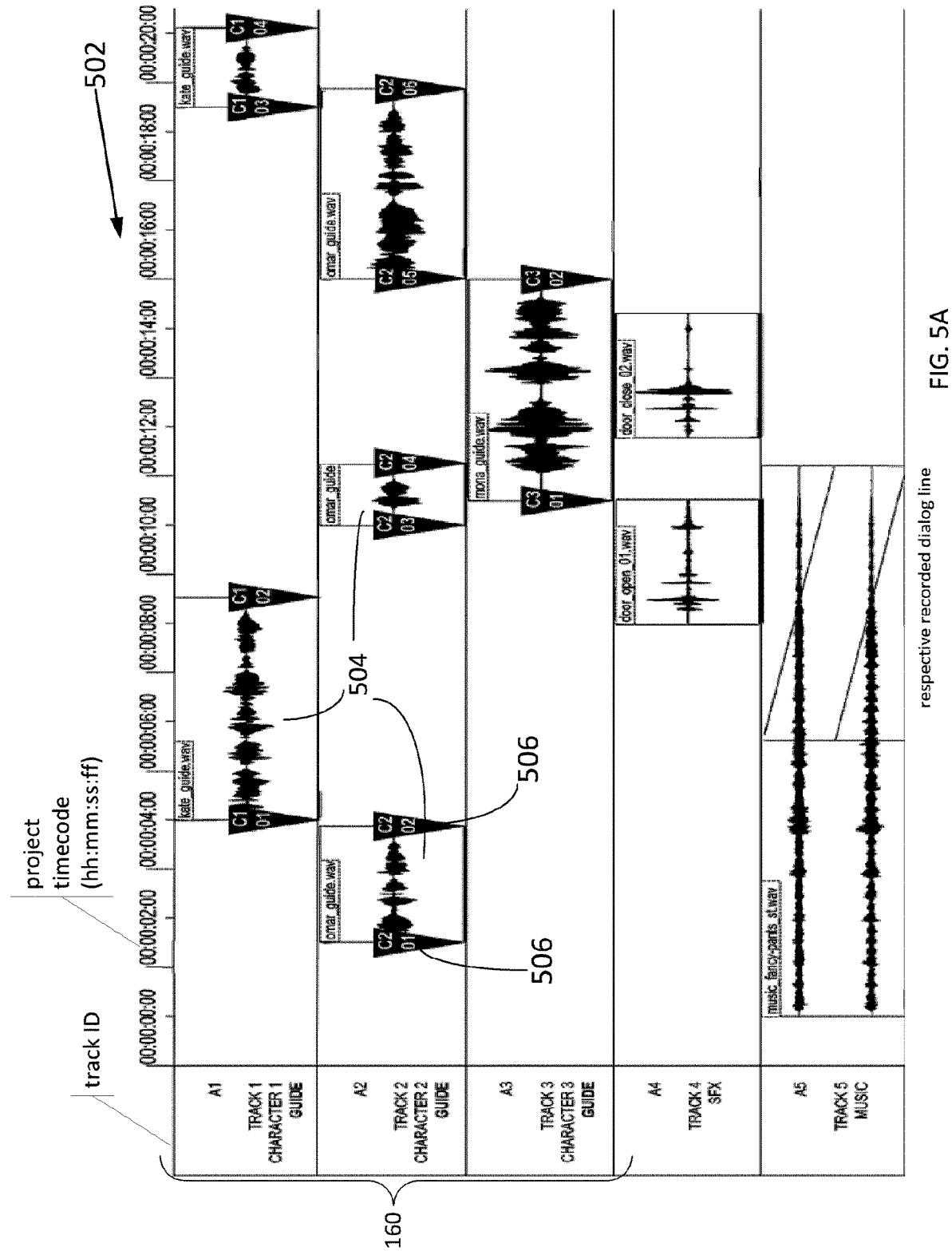
FIG. 5A shows an example of a metadata management (MM) user interface containing media assets organized into tracks together with media asset start and media asset end tags.

FIG. 5A illustrates an example of a graphical user interface that can be displayed on a display screen 27 of a processor enabled device 20 on which MM module 15 is implemented. FIG. 5A provides a graphical illustration of the elements included in Media Program 150, namely a plurality of audio tracks (e.g., Tracks 1 to 5), illustrated as respective rows with sound wave patterns. The audio tracks include Character Tracks (e.g., Tracks 1 to 3), each of which corresponds to the dialog lines of a different character (e.g., Track 1 corresponds to Character 1, etc.). The audio tracks also include an SFX track (e.g. Track 4) and a Music Track (e.g., Track 5).

The tracks are along a project timeline 502. Each discrete waveform element on each Character Track corresponds to a respective recorded dialog line of the corresponding character. These respective recorded dialog lines are each referred to in this disclosure as a respective Media Assets 504. In some examples, each respective Media Asset 504 is formatted and stored as a discrete audio file, for example as a respective .wav file. In alternative examples, the Media Assets 504 that correspond to a single audio track may be collected into a single audio file. In some examples, each track of program 150 is originally a single audio file but is automatically parsed into respective audio files for each media asset 504. In the following description, the Media Assets 504 are each considered as discrete audio files (e.g., each Media Asset 504 is represented by digital audiowave data in a respective .wav file).

In a conventional media playback system, each audio file (e.g., each Media Asset 504) as shown in FIG. 5A is triggered by its absolute, real-time location along the project timeline 502. For example, the first audio file to be played is the music file on track 5, which occurs 1 second after the project timeline 502 begins; the second audio file to be played is Character 2's first dialogue line, which occurs at 2.5 seconds after the project timeline 502; the third audio file to be played is Character 1's first dialogue line, which occurs at 5 seconds after the project timeline 502 begins; and so on.

In an illustrated example, selected audio tracks (for example, Character Tracks 160) of the Media Program 150 are identified as character guide tracks (Guide Tracks) [Block 204] (tracks labelled "GUIDE" in FIG. 5A). Guide Tracks are identified so they can be replaced later with new User Recordings of the same Character, as applicable. In some examples, one or more Guide Tracks are identified manually by a user interacting through a user input device 30 to provide inputs to MM module 15. In some examples, MM module 15 may include an automatic Guide Track recognition function that is configured to detect all audio tracks that have a waveform pattern that corresponds to spoken dialog lines and label such tracks as Guide Tracks.

In an example embodiment, the MM module 15 is configured to generate a set of basic metadata attributes 580 for each of the Media Assets 504 [Block 205]. An example of these basic metadata elements 580 are shown in FIG. 5B. At least some of these basic metadata attributes 580 are configured to correspond to the metadata attributes 180 that are included in the Gen2 Script 156, and include (1) Line Number; (2) Character ID; (3) Media Asset Start Tag ID (corresponds to and has same format as Script Text Start ID); and (4) Media Asset End Tag ID (corresponds to and has same format as Script Text End ID). Although not shown in FIG. 5B, each of the Media Assets 504 will also have the following corresponding attributes (Shown in FIG. 7C): (5) "Program Timecode In" that indicates a timecode on the Project Timeline 502 that corresponds to the start of the Media Asset. In the graphic representation of the Media Asset Start Tag 506 for each Media Asset is aligned with the Program Timecode In for that Media Asset; and (6) "Program Timecode Out" that indicates a timecode on the Project Timeline 502 that corresponds to the end of the Media Asset. In the graphic representation of the Media Asset End Start Tag 506 for each Media Asset is aligned with the Program Timecode Out for that Media Asset.

In this regard, the Media Asset Start Tag ID and Media Asset End Tag ID correspond to Tags 506 that mark the beginning and ending of each dialogue line Media Asset 504 within each Character Guide Track, relative to the Project Timeline 502, shown graphically in FIG. 5A. The process [Block 205] of generating the set of basic metadata elements 580, which can be automated in example embodiments, occurs in a similar manner as the script format conversion process, such that each line of dialogue can be replaced later with new User Recordings. In some examples, a user can manually add Tags 506 or adjust the location of Tags 506 by interacting with an input device 30 that can be used to manipulate the user interface screen of FIG. 5A with corresponding changes to the values of the basic metadata attributes 580 shown in FIG. 5B.

As indicated in FIG. 4A, the Gen2 Script 156 is then imported [Block 206] by the MM module 15. An alignment operation [Block 207] can then be performed to align the set of basic metadata attributes 580 generated for the Program 150 with the metadata attributes 180 of the corresponding Gen2 Script 156. Alignment operation 207 can be used to validate that the set of basic metadata attributes 580 generated Program 150 correctly align with the set of metadata attributes 180, including for example that the information included in the Media Asset Start Tag ID and Media Asset End Tag ID for the recorded dialog lines matches that of the Script Asset Start ID and Script Asset End ID for the corresponding Script Text line. In some examples, a speech recognition system, including but not limited to speech-to-text and text-to-speech software modules, may be used to compare the content of recorded media assets 504 with their corresponding Script Text lines. In some examples, discrepancies can be displayed on a user interface, and a user provided with an opportunity to edit both the script metadata attributes and the media asset metadata attributes as required. This completes a Project setup for the Media Program 150. It will be noted that in some examples the Gen2 Script 156 can be generated automatically based on the audio content of Media Program 150 and the basic metadata attributes 580 using speech-to-text recognition, eliminating the need for the process of FIG. 2B at the cost of removing quality control comparison provided by [Block 207].

Figure 6:
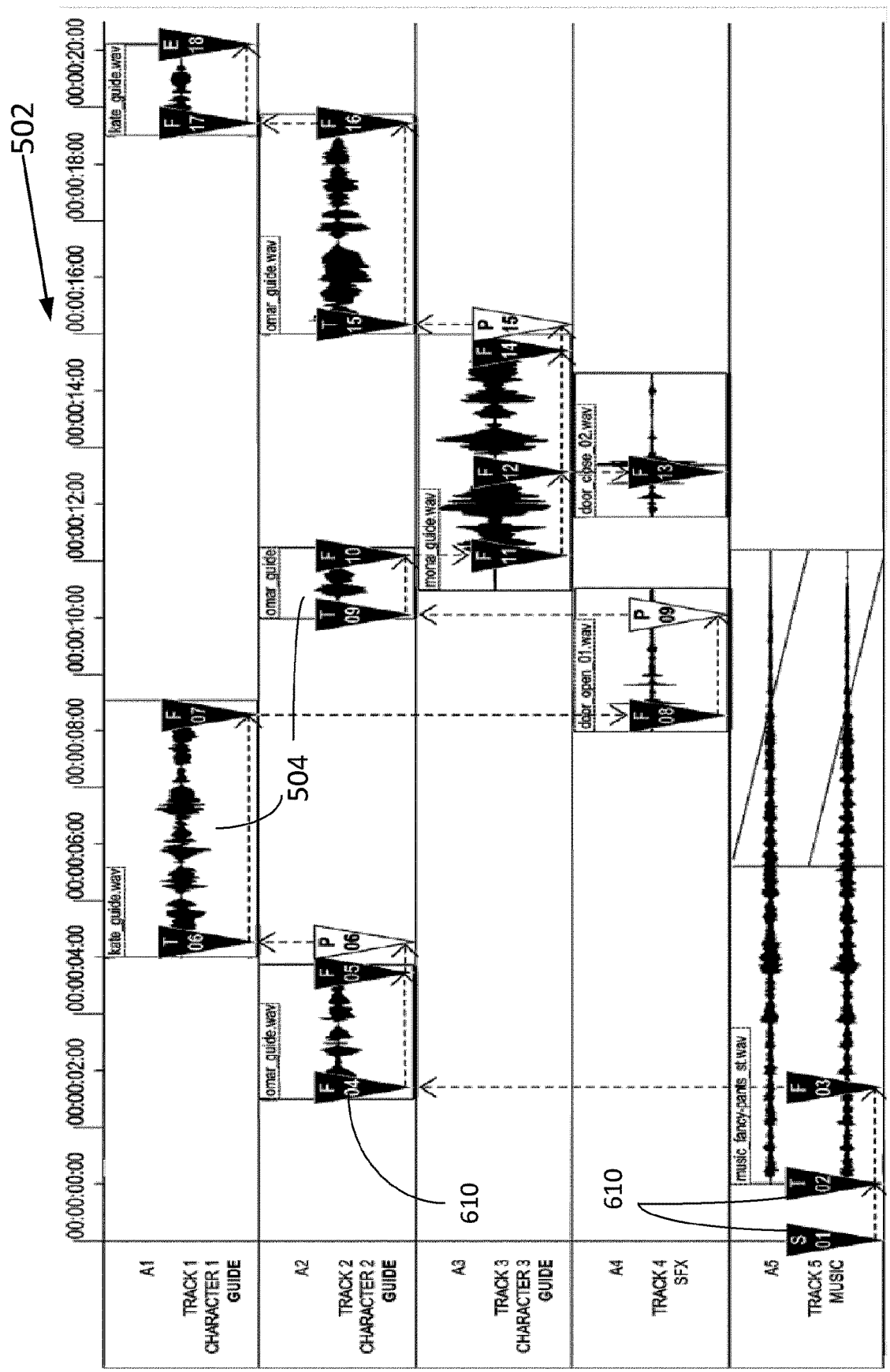
FIG. 6 shows an example of the MM user interface with sequencing automation media asset trigger markers.

With the Project setup complete, a user can then interact with the MM module 15 to generate a further set of metadata, including Sequence Automation Markers, for a Project that corresponds to the Media Program 150 [Block 208]. FIG. 6 illustrates an example of graphical user interface with graphical representations of Sequence Automation Markers 610 for a Project. The Markers 610 identify relative timing references for each audio file in the Media Program 150, and in this regard enable a modified playback sequence to be created for Media Assets that is not directly tied to project timeline 502. As will be explained in greater detail below, this can be relevant when media assets 506 are selectively replaced.

The Markers 610 as shown in FIG. 6 provide reference points throughout the Project that act as "triggers" for other audio files (e.g., other media assets 504) during program rendering. There are five main classes of Markers 610, illustrated in FIG. 6: 1) A Marker identifying the start of the Project (Start Marker, denoted with and "S"); 2) Markers identifying an absolute time from the last Marker in the sequence (Time-Based Marker, each denoted with a "T"); 3) Markers identifying a timecode location within a media asset 504, where the timecode starts at the beginning of the media asset 504 (Asset-Based Marker, each denoted with an "F"); 4) Markers that are automatically generated and added to the same track as the previous marker in the sequence as a reference point that correlates to a Time-Based Marker that is added to a different track (Phantom Marker, each denoted with a "P"); and 5) a Marker identifying the end of the Project (End Marker, denoted with an "E"). As indicated in FIG. 6, each of the Markers 610 are sequentially numbered based on their appearance within the project timeline 502, such that an ID for each Marker 610 is denoted in the format: [Marker Class, Marker Counter Number (excluding Phantom Markers)]. Marker Counter Number refers to the occurrence of the Marker in the sequence of markers, excluding any Phantom markers. For example, the final Marker is the 21st marker in the sequence, but is the 18th Non-Phantom Marker, and is an End marker, and as such is denoted by Marker ID "E 18". Phantom Markers are assigned the same Marker Counter Number as the Marker that they trigger (e.g., Phantom Maker ID P09 triggers (points to) Asset-Based Marker ID T09 In some examples, a user can add, drag and drop and assign types to Markers 610 by using input device(s) 30, with real time graphical feedback being displayed. In some examples, MM Module 15 may be configured to automatically create and place Markers 610 based on asset of pre-defined rules. The Marker locations and types can then be manually adjusted by a user.

As will be explained in greater detail below, the Markers 610 each represent automation metadata for media asset sequencing.

With the Markers 610 all set, they collectively constitute a draft set of Project Automation Metadata that can be used to generate and test a Draft Program Version. In this regard, a Draft Program Generating operation [Block 209] can be an automatic process that, when activated, generates a Draft Program Version of the Media Program 150, by removing all the media assets 504 from their absolute, real-time location in the project timeline 502, and reassembling the Media Assets according to the sequence of Markers 610 (e.g., the draft set of Project Automation Metadata). In other words, in the test rendering, audio asset 504 is triggered by a respective Marker 610 rather than an absolute position in the Project timeline 502. The sequence of Markers 610 forms the instructions to reassemble the media assets 504 to make a final Program.

The rendered Project is then tested [Block 210]. The sequencing and content of the Media Assets in the Draft Program Version should be identical to that of the media assets in the original Media Program 150. If they are not identical, there is likely an error in the Marker sequencing, which could require an edit (e.g., "fail" causes a loop back to Block 208). If they are identical (e.g., "pass") the MM Module 15 activates three processes: 1) generate script metadata [Block 220]; 2) generate Project Automation Metadata [Block 230]; and 3) audio file conversion [Block 240].

The generate script metadata process [Block 220] is configured to embed a further level of metadata (Gen3 metadata) into Gen2 Script 156 (or create an associated file), thereby generating a Gen3 Script 221, which is then uploaded [Block 222] to a script directory 311 that can be stored in a database 370 associated with server 300. In this regard, FIG. 7A shows an example content of a worksheet format file corresponding to a Gen3 Script 221 example. In Gen3 Script 221, the metadata Tags corresponding to Script Text Start ID and Script Text End ID have been renamed to Media Asset Start Tag ID and Media Asset End Tag ID, reflecting the results of script/media asset alignment operation of Block 208. Further, the following Gen3 metadata attributes are added for each script dialog line and assigned values by MM module 15: (1) "Media Asset ID", a unique identifier assigned to each character media asset and background (e.g., SFX and Music) media asset, which takes the form "[Character ID][Asset Sequence Number]" in the case of a character media asset and "[Background ID][Asset Sequence Number]" in the case of a background media asset, where Asset Sequence Number indexes the start order of the media assets with the Program 150; (2) "Guide Track". An indicator flag that is used to indicate media assets that correspond to Guide Tracks identified in process operation of Block 204; (3) "Media Asset Start", a timecode that corresponds to the start of the subject Media Asset (assigned 00:00:00:00, using a Society of Motion Picture and Television Engineers (SMPTE) timecode format hh:mm:ss:ff, where "ff" corresponds to an intra-second frame count). Note that "Media Asset Start" is a relative value that refers to the subject media asset itself, rather than the project timeline; and (4) "Media Asset End", a timecode that indicates the end of the subject media asset, measured from the Media Asset Start for the subject media asset.

The generate Project automation metadata process [Block 230] is configured to generate a Project Automation Metadata 231 that corresponds to the Marker placement that has been set using the User Interface of FIG. 6. The Project Automation Metadata 231 is then uploaded [Block 232] to a project automation metadata directory 321 that can be stored in database 370. The Project automation metadata 231 includes the metadata generated in the operations set out in Block 208, and in particular the Project automation metadata 31 contains data about Markers 610 and sequence instructions for the Program. In this regard, FIG. 7B shows an example content of a worksheet format file corresponding to an example of a Project automation metadata 231.

As indicated in FIG. 7B, the Project Automation Metadata 231 includes a sequential list of the Markers 610 in order of their sequential appearance in Program 150. Each Marker 610 can be assigned the following metadata attributes in the Project automation metadata file 231:

(1) Marker Number: A sequence number for the Marker that indexes that Marker's order of occurrence in the Program 150 (note that unlike Marker Sequence Counter, Marker Number increments for Phantom class Markers as well as all other Marker classes)
(2) Marker Class: An indicator of which of the five possible marker class categories (described above) that the Marker belongs to;
(3) Market ID: combination of Marker Class and Marker Sequence Counter;
(4) Triggered By Marker ID: indicates the Marker ID of a previous Marker that acts as a trigger marker (i.e., points to or links to) the Marker;
(5) Marker Type: Indicates that a marker type is one of the following: (a) Program Start (e.g., Marker that marks the start of the program); (b) Audio Start (e.g., Marker that marks a point indicating a start location for the audio waveform within the media asset); (c) Audio End (e.g., Marker that marks a point indicating an end location for playback of a currently active media asset); (d) Trigger Point (Marker that is a trigger point for a further Marker associated with a different Media Asset); (e) Program End (e.g., Marker that marks the End of the program).
(6) Speech Sync: Flag that indicates that Marker is associated with a speech event occurring within a media asset (e.g., Marker ID F12, which triggers a door closing FX sound, is associated with an intermediate lull in the speech waveform of media asset C3006M).
(7) Program Timecode: Provides an absolute timecode for the Marker that corresponds to the time the Marker is located on the Project Timeline 502 (e.g., in the case of Marker Number 002, the Marker is anchored to the starting point of its associated Media Asset, M1001S);
(8) Anchor To: Indicates a type of anchor point that the Marker is anchored to (e.g., "Timecode" means that Marker is an absolute marker and its anchor point is a specific Project Timeline time; "Media Asset" indicates that Marker is a relative Marker and its anchor point is relative to the start of its respective Media Asset (e.g. in the case of Marker ID F04, the Marker anchor point is a time that is "Offset" 00:00:00:06 from the start of its associated Media Asset, C2002M); "Duration", used only for "Phantom" class Markers, indicates a duration from the marker that is the Trigger Marker for the Phantom Marker (e.g. in the case of Marker Number 006, the Marker is anchored to Marker ID F08, the previous Marker in its same Track);
(9) Media Asset ID: The ID of the Media Asset that the Marker is associated with;
(10) Media Asset Name: The file name of the Media Asset that the Marker is associated with;
(11) Offset: Indicates a timing offset of the Marker relative to the start of its associated Media Asset, and defines the Anchor Point for the Marker; and
(13) Time to Next Marker: timecode that indicates time duration from the Marker to the next occurring Marker triggered by the Marker.

It will be noted that of the Marker attributes listed above that are timecode based, "Program Timecode" is a value that points to an absolute, common reference timeline, namely Project Timeline 502. The "Offset" and "Time to Next Marker" timecode attributes are relative time values.

The convert audio files process [Block 240] is configured to generate project audio files 241 (with associated Gen3 asset metadata 241A), which are then uploaded [Block 242] to a project audio files directory 331 that can be stored in database 370. The Project audio files 241 (also referred to as Project media files), which include the content data (e.g., digital audio recordings) required for all media assets included in the multiple program tracks (e.g., Guide Tracks, SFX Track(s), Music Track(s)), are each converted into a media file format that coincides with and/or contains Gen3 asset metadata 241A. FIG. 7C illustrates worksheet file format example of Gen3 asset metadata 241A, which includes a sequential list of Project Events. Each Project Event corresponds to a respective project media asset. A set of metadata attributes is defined for each of the respective media assets, including: (1) Media Asset ID, as described above; (2) Character ID, if the media asset corresponds to a Character dialog line; (3) Media Asset Name; (4) Track ID for the track that the Media Asset is part of; (4) Guide Track: Indicates if Media Asset corresponds to a Guide Track; (5) Media Asset Start Tag ID: ID of the Start Tag for the Media Asset; (6) Program Timecode In: indicates an absolute timecode on the project timeline 502 that coincides with the start of the media asset—this value corresponds to an absolute project timecode 502 (it will be noted that the Program timecodes for Audio Start Markers for media assets are typically offset by a number of frames from the Program Timecode for the same media asset. This can be done to account for the fact that actual audio soundwave data typically trails the start of the media asset that includes that data by a number of frames (for example, a 10 frame offset in a 30 frames per second (FPS) recording will result in a 0.33 second delay); (7) Media Asset End Tag ID: ID of the End Tag for the Media Asset; (8) Program Timecode Out: indicates an absolute timecode on the project timeline 502 for the end of the media asset is to end (can be offset from the Audio End marker location); (9) Length: Indicates the length of the media asset (e.g., Program Timecode Out—Program Timecode In).

The generation of attributes for Gen3 Script 221, project automation metadata 231 and Project Audio Files 241 will now be summarized with reference to FIGS. 5A to 7C. In the graphical user interface FIG. 5A, across the top of the display, on the x-axis, a timecode is displayed in hours: minutes:seconds:frames (hh:mm:ss:ff), where the beginning of the Project is represented by 00:00:00:00, and in the example shown, the frame rate is 30 frames per second. Along the y-axis in the display, the tracks are displayed, with each track containing media assets 504 along the timeline. In the case of known media program systems, when a user activates playback of a Project, an audio event (e.g., audio playback) of each media asset 504 on each track is triggered by a timecode that corresponds to the start of the respective media asset 504. In the absence of the Tags as shown in FIG. 5A, the placement of the media assets 504 on the tracks in the Project is initially determined by the content of the OMF file 106.

The Gen3 Asset Metadata 241A functions as an Edit Decision List (EDL) for the Project. In particular, it includes playback sequence data that comprises list of Media Assets and associated timecodes required to render a program that includes all of the program Media Assets in the correct playback order. A rendering device that is provided with Gen3 Asset Metadata 241A and the media files that correspond to the Media Assets identified in the Gen3 Asset Metadata 241A will be able to render a media program that is in a suitable format for playback on a playback device (for example, a UE device 10). In some examples the rendered media program will be in a format that can be downloaded and stored locally on the playback devices, and in some examples it may be streamed to the device for immediate playback.

As described above, Start and End Tags (corresponding to Media Asset Start Tag ID and Media Asset End Tag ID, respectively) are added to the beginning and ending of each dialogue line within each Character Guide Track. This may occur manually and/or automatically by the MM Module 15. In the example shown in FIG. 5A, Tag C1.01 represents the start of the first audio file on track 1, which corresponds to Character 1 (Kate), which is also designated as a Guide Track. Tag C1.02 represents the end of that audio file. Tag C2.01 represents the start of the first audio file on track 2, which corresponds to Character 2 (Omar), which is also designated as a Guide Track. Tag C2.02 represents the end of that audio file, and so on. Of the 5 tracks in the example shown in FIG. 5, the top 3 tracks are designated as the Guide Tracks.

Also shown in FIG. 5A is track 4, which is used for sound effects audio files (SFX), and is not designated as a Guide Track, and track 5, which is used for music audio files, and is not designated as a Guide Track.

The MM Module retains data attributes about the duration of each audio file (e.g., media asset) in the Project.

As described above, FIG. 6 illustrates the placement of Markers 610 in the MM module graphical user interface, which provide reference points throughout the Project that act as "triggers" for other media assets. In other words, the Markers are used to create alternative sequencing triggers for the media assets, rather than just absolute locations of the media assets on the project timecode.

In the example shown in FIG. 6, the following is a description of the placement and reference of the Markers (the term audio file is used in the following description of FIG. 6 to refer to media assets as the illustrated example corresponds to an audio program):

S.01 is a Start Marker, and is the first Marker in the sequence. It represents the beginning of the Project, where the audio file (or event) trigger is timecode 00:00:00:00. It is positioned on track 5, but can be positioned on any track. If the Start-Marker is positioned on a track that is not the same track as the next Marker in the sequence, a Phantom Marker would be automatically generated as described below.

T.02 is a Time-Based Marker, and is the second Marker in the sequence. It represents a trigger for the first audio file in the sequence, which is the music file on track 5, which occurs at 00:00:01:00 as shown.

F.03 is a File-Based Marker, and is the third Marker in the sequence. It represents a timecode within the music file on track 5, which in this case is 00:00:01:21. For clarity, this timecode represents 1 second and 21 frames measured from the beginning of the audio file, as opposed to the Project timecode of F.03, which is 00:00:02:21.

F.04 is a File-Based Marker, and is the fourth Marker in the sequence. It represents a timecode within the first audio file on Guide Track 2, the first dialogue line of Character 2, which in this case is 00:00:00:06. For clarity, this timecode represents 6 frames measured from the beginning of the audio file, or C2.01 as shown in FIG. 5A, as opposed to the Project timecode of F.04, which is 00:00:02:21.

In the example shown, Marker F.03 represents a time location within the music audio file on track 5, that acts as a reference point to trigger Marker F.04, which in this case has been placed to coincide with the start of the dialogue line. Since F.04 is located 6 frames after C2.01, the MM Software stores instructions that cause the audio file to be triggered 6 frames before the Marker (i.e. at 00:00:02:15). This enables the F.04 Marker to coincide with its F.03 trigger on the Project timeline. In other words, Markers F.03 and F.04 are positioned such that they have the same Project timecode.

F.05 is a File-Based Marker, and is the fifth Marker in the sequence. It represents a timecode within the first audio file on Guide Track 2, the first dialogue line of Character 2, which in this case is 00:00:02:02. For clarity, this timecode represents 2 seconds and 2 frames measured from the beginning of the audio file. Marker F.05 is placed at the noted location to represent the end of the dialogue line, which can be viewed visually according to the audio waveform display as known in the art. C2.02, the default end of the audio file, in this case is not used.

P.06 is a Phantom Marker, which is generated automatically by the MM Software, and corresponds with T.06. It represents a measure of real time between Marker F.05 and Marker T.06, described below. As noted above, Phantom Markers are not counted in a Marker Count Sequence that is used to assign Marker IDs.

T.06 is a Time-Based Marker, and is the sixth Marker in the sequence. It represents a timecode within the first audio file on Guide Track 1 or the first dialogue line of Character 1 as shown, which in this case is 00:00:00:07. For clarity, this timecode represents 7 frames measured from the beginning of the audio file, or C1.01 as shown in FIG. 5A. Since T.06 is a Time-Based Marker, the MM Software stores the time difference between the Project timecode of T.06 (or P.06) at 00:00:05:07, and the Project timecode of the previous trigger Marker in the sequence, F.05 at 00:00:04:17, for a difference of 00:00:00:20, or 20 frames. In other words, T.06 occurs 20 frames after F.05. However, since T.06 is placed at 00:00:00:07 from the beginning of the first audio file on Guide Track 1 or C1.01 as shown in FIG. 5A, the first audio file on Guide Track 1 will be triggered 7 frames before the T.06 Marker. Therefore, the beginning of the first audio file on Guide Track 1 will be triggered 00:00:00:13 or 13 frames after F.05. C2.02, the default end of the audio file, in this case is not used.

F.07 is a File-Based Marker, and is the seventh Marker in the sequence. It represents a timecode within the first audio file on Guide Track 1, the first dialogue line of Character 1, which in this case is 00:00:04:08. C1.02, the default end of the audio file, in this case is not used.

F.08 is a File-Based Marker, and is the eighth Marker in the sequence. It represents a timecode within the first audio file on track 4, the first SFX cue, which in this case is 00:00:00:08, or 8 frames. In like manner as described above, since F.08 is located 8 frames after the beginning of the first SFX audio file, the first SFX audio file is triggered 8 frames earlier such that Project timecode of the F.08 Marker is equal to the Project timecode of F.07.

P.09 is a Phantom Marker, which is generated automatically by the MM Software, and corresponds with T.09. It represents a measure of real time between Marker F.08 and Marker T.09, described below.

T.09 is a Time-Based Marker, and is the ninth Marker in the sequence. It represents a timecode within the first SFX audio file on track 4, which in this case is 00:00:02:08, or 2 seconds and 8 frames measured from the beginning of the first SFX audio file on track 4. Since T.09 is a Time-Based Marker, the MM Software stores the time difference between the Project timecode of T.09 (or P.09) at 00:00:11:08, and the Project timecode of the previous trigger Marker in the sequence, F.08 at 00:00:09:08, for a difference of 00:00:02:00. In other words, T.09 occurs 2 seconds and 0 frames after F.08. However, since T.09 is placed at 00:00:00:08 from the beginning of the second audio file on Guide Track 2 or C2.02 as shown in FIG. 5, the second audio file on Guide Track 2 will be triggered 8 frames before the T.09 Marker. Therefore, the beginning of the second audio file on Guide Track 2 will be triggered 00:00:01:22 or 1 second and 22 frames after F.08.

Since the first SFX audio file on track 4 is not identified as a Guide Track, which means it will not be replaced later as described above, the length or duration of that audio file remains constant. Therefore, in an alternate sequence structure, placing a File-Based Marker in the same location as P.09 that triggers T.09 as shown will produce the same results.

F.10 and F.11 are File-Based Markers, and are the tenth and eleventh Markers in the sequence, respectively. They represent timecode references in like manner as the File-Based Markers described above.

F.12 is a File-Based Marker, and is the twelfth Marker in the sequence. It represents a timecode within the first audio file on Guide Track 3 or the first dialogue line of Character 3 as shown, which in this case is 00:00:02:04. In the example shown in FIG. 6, F.12 is placed near the middle of the audio file or in the middle of a dialogue line. F.12 acts as a trigger for F.13, which is the thirteenth Marker in the sequence, and represents a second SFX cue on track 4, and is triggered in like manner as the File-Based Markers described above.

F.14 is a File-Based Marker, and is the fourteenth Marker in the sequence. Since F.14 is positioned on a Guide Track, it must follow F.12 in the sequence, and not F.13, which would produce an error.

P.15, T.15, F.16 and F.17 represent timecode references in like manner as the Markers described above.

E.18 is an End Marker, and is the last Marker in the sequence. It represents the end of the Project. It is positioned on Guide Track 1, as shown, but can be positioned on any track. If the End-Marker is positioned on a track that is not the same track as the preceding Marker in the sequence, a Phantom Marker would be automatically generated as described above.

On the graphic user interfaces of FIG. 6, in which the media assets are organized into tracks along the y-axis relative to a timeline along the x-axis, the dashed arrows represent the playback sequencing of the Markers, with each marker being triggered by a previous marker in the sequence, with exception of the Start Marker.

Figure 4C:
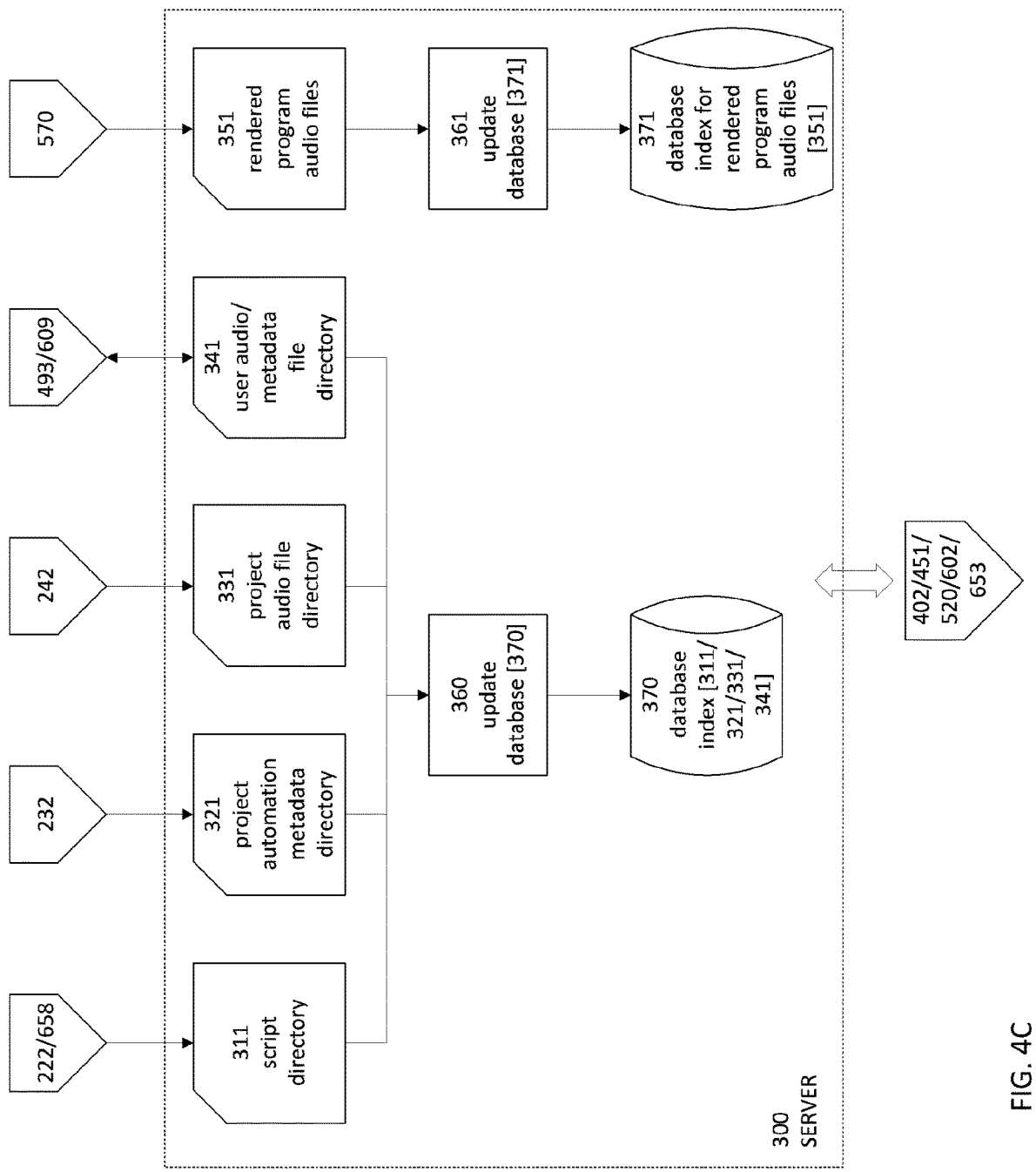
FIG. 4C is block diagram of an example of a server infrastructure.

As noted above, the process 400 of 4A and 4B generates Gen3 Script 221, project automation metadata 231 and Project Audio File 241 corresponding to a Project. FIG. 4C illustrates a sample file storage and/or electronic server structure that can be implemented at Server 300 according to example embodiments. The file structure is presented only as an example as any number of known file infrastructures, database systems and indexing systems known in the art can be used to store Gen3 Scripts 221, project automation metadata 231 and Project Media Files 241 for a number of respective Projects.

In FIG. 4C, script directory 311 is an electronic file storage center which contains a collection of Gen3 scripts 221 (with associated and/or embedded Gen3 metadata), which is indexed and referenced in database 370. Project Automation metadata directory 321 is an electronic file storage center which contains the collection of Project Automation metadata files 231, which is indexed and referenced in database 370. Project media (e.g., audio) file directory 331 is an electronic file storage center which contains the collection of Project media files 241 and associated metadata, which is indexed and referenced in database 370. The Project media file database contains all audio files with associated and/or embedded Gen3 metadata 241A, which include the Character Guide Tracks, SFX, music, and/or all audio files associated with the original Program 150.

User audio file directory 341 is an electronic file storage center which contains the collection of User Generated Track Recordings 432 (with embedded and/or associated Gen3 metadata 492) (described in greater detail below), which is indexed and referenced in database 370.

Database index 370 is an index of directories 311, 321, 331, and 341, which is updated on a time schedule and/or upon detection of a file and/or metadata change within the directory. Database 370 may be a standalone database or part of an indexing infrastructure as required, as known in the art.

Rendered program media/audio file directory 351 is an electronic file storage center which contains the collection of Rendered Programs 590 (which can include media/audio files and associated and/or embedded metadata), which is indexed and referenced in database 371.

Database index 371 for rendered program media/audio files is an index of directory 351, which is updated on a time schedule and/or upon detection of a file and/or metadata change within the directory. Database index 371 may be a standalone database or part of an indexing infrastructure as required, as known in the art.

Figure 8A:
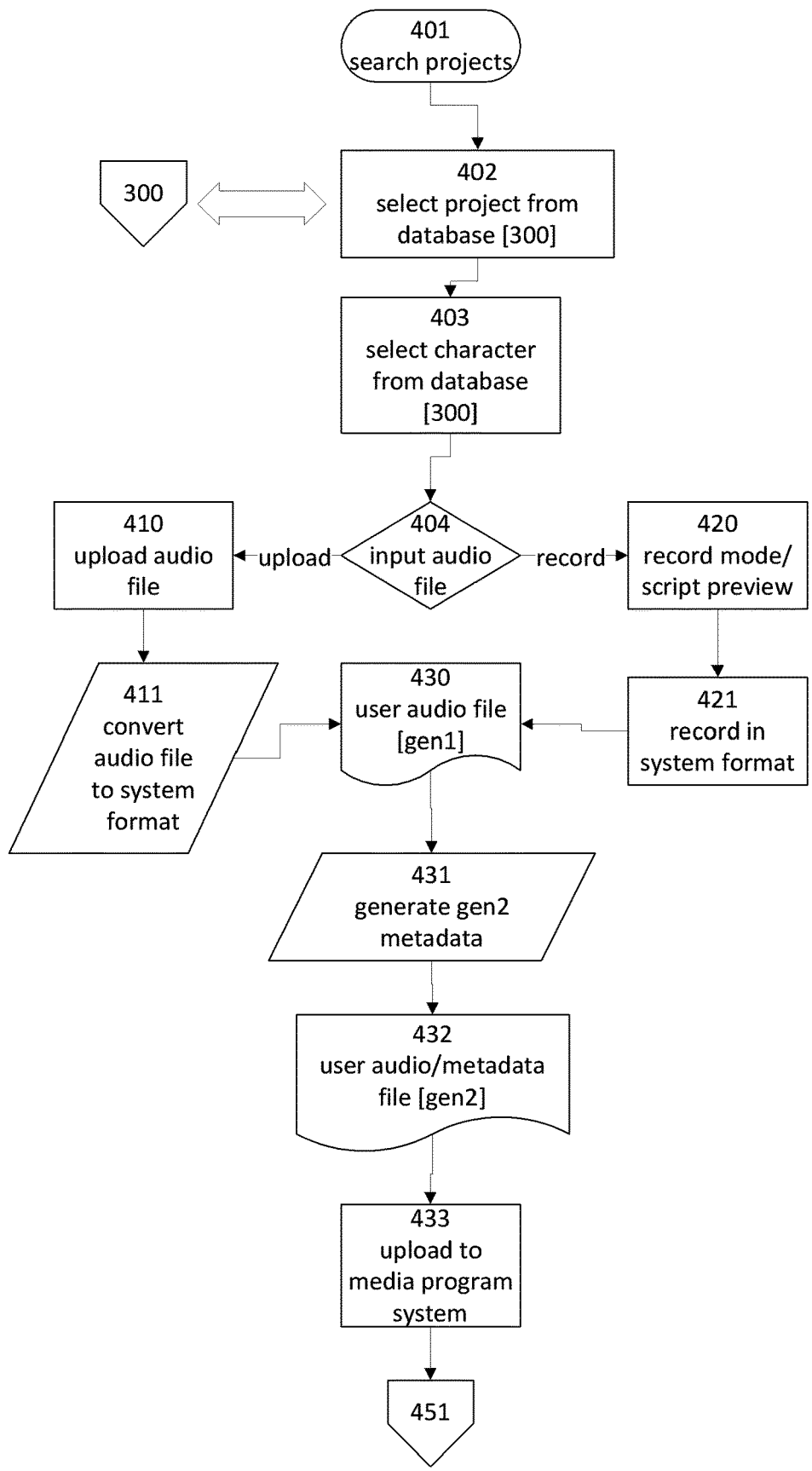
FIG. 8A shows an example workflow for a user to create a user recording.

Example embodiments are configured to allow a participant (User) to record a Character Track of their own to replace a respective guide track. In this regard, FIG. 8A illustrates an example process workflow 400 for a User to select a Project and a Character, record their performance of that Character, and submit the resultant User Recording for further processing.

In an example embodiment the User has a UE device 10 having an application 22 that includes software instructions and data that configuring the UE device to implement a user content creation module 17. Content creation module 17 enables the User to access media Program System 12 and Database 370 through network 16 and create their own version of a Character Track. Using the Content creation module 17 of UE device 10, the User can search for a Project to work with [Block 401] that contains a Character for which the User will record a performance, also known as a User Recording as described above. The search function enabled by Media Program System 12 may for example contain search filters which may include but not limited to Project title, genre, popularity, rating, and/or the intended User age range.

This search process can entail retrieving one or more of Project files (including for example original Program files 150, and or Script Files as well as other project related files) from Server 300, such that Projects can be reviewed. Project reviews occur by means of the User reading the Project script and/or other Project information made available by any combination of the metadata stored in the database 300. Projects can be recalled by searching database 370 for specific parameters relating to the Project, which may include but not limited to Projects that contain Characters and/or scripts that have certain features and/or characteristics, or browsing through Projects, which may be sorted and/or filtered based on preferences the User selects, which may include but not limited to Project and/or performance ratings.

Figure 9:
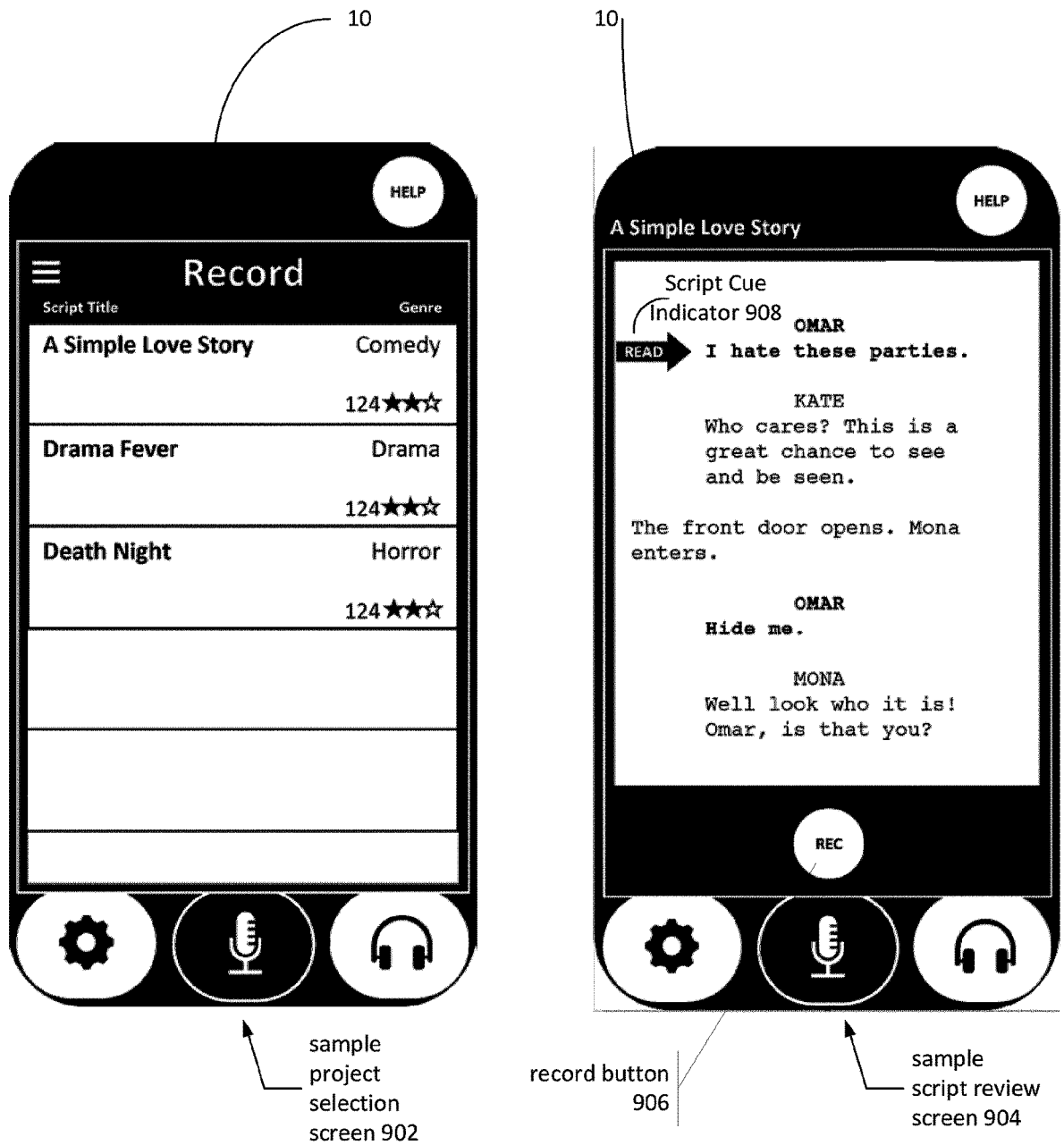
FIG. 9 shows examples of user interfaces presented on a user device during creation of a user recording.

FIG. 9 shows illustrations of first and second interactive user interface screens 902, 904 generated on a UE device 10. The bottom row of each interface screen presents three possible selection options. From left to right they are: "settings", represented by a circular gear apparatus; "record" 906, represented by a microphone, and "listen", represented by a pair of headphones.

First interactive user interface screen 902 (left screen) shows a sample project selection screen, which consists of a list of Projects that can be sorted and/or filtered based on the User's preferences. The User can search, browse and select Projects from this menu. After searching for a Project, the User selects a Project to work with [Block 402] by interacting with user interface screen 902. A similar Character selection screen can be displayed for the selected project, enabling the User to select a Character to record [Block 403].

User guide data (for example a script file) can then be provided by Media Program System 12 to the UE device 10 that will enable the User to use UE device 10 to review, rehearse and record the dialog lines corresponding to the selected character. By way of example, referring to FIG. 9, the second user interface screen 904 generated by UE device 10 shows a set of dialog lines corresponding to a selected Project (e.g., "A Simple Love Story"), which can provide a means for the User to review, rehearse and record a selected Character's lines (presented in highlight) from a script.

Once the Project is selected, the User provides a recording of the User's performance [Block 404]. This can be done in one of two ways: The User can record their performance directly using the UE device 10, or the User can record their performance using another audio recording device, and upload the resultant User Recording to the UE device 10.

In the case where the User records their performance using the UE device 10, the User is presented with the dialog script for the selected Project. Content creation module 17 enables an audio recording feature that makes use of the smartphone's built-in microphone (input device 30), and also a script preview feature [Block 420]. With reference to the user interface 904 of FIG. 9, when the User is ready to record their performance, a record feature is activated (e.g., by pressing record button 906), and an audio input of the user is recorded and edited if applicable [Block 421], to generate a User Recording 430 in a pre-defined system format. In one example embodiment, Gen1 user recording is a single .wav file that includes audio waveform data that corresponds to user spoken dialog lines, as recorded by the UE device microphone, interspersed with dead time that corresponds to other characters' lines. In some examples, the graphical user interface 904 presented by content creation module 17 may highlight dialog lines that are attributed the User's selected character, and align a script cue indicator 908 next to the dialog line that the user should be speaking at a given time. In alternative examples, UE device 10 may be configured to save each audio dialog line as a separate file.

In the case where the User records their performance using another audio recording device, the User can read their selected character's dialog lines based on script lines based on UE device user interface 904 as shown in FIG. 9, or the User can read directly from a copy of the script that is made available on another device including but not limited to a printed copy. The User then uploads the resultant User Recording to the UE device 10 [Block 410], which may convert the User Recording to a pre-defined format [Block 411], resulting in User Recording 430.

The user content creation module 17 then generates a first enhanced set of metadata attributes (e.g., Gen2 metadata) for the User Recording 430. FIG. 8B illustrates an example of a worksheet format file that includes an enhanced set of metadata attributes 802 for the User Recording 430. The enhanced set of metadata attributes 802 contains information obtained from the user content creation module 17 relating to the User's input, settings, and/or preferences including but not limited to User's App settings, the User's account information, the device the App is installed on, device location, time, and or all of which may pertain to the Project and/or the User Recording 430. The metadata attributes 802 can also include: a Media Asset ID for the User Recording; a Character ID indicating the character whose dialog is the subject of User Recording 430; a Media Asset (Audio File) Name for the User Recording 430, and a Program Track ID.

The enhanced set of metadata attributes 802 for the User Recording 430 is embedded into and/or associated with the User Recording 430, resulting in one or more User Recording/Metadata File(s) 432 (referred to hereafter User Generated Track Recording 432) that includes the content of User Recording 430 and Enhanced Metadata 802. The User Generated Track Recording 432 is then uploaded [Block 433] to media program system 12 for audio alignment processing, an example of which is illustrated in FIG. 10.

Figure 10:
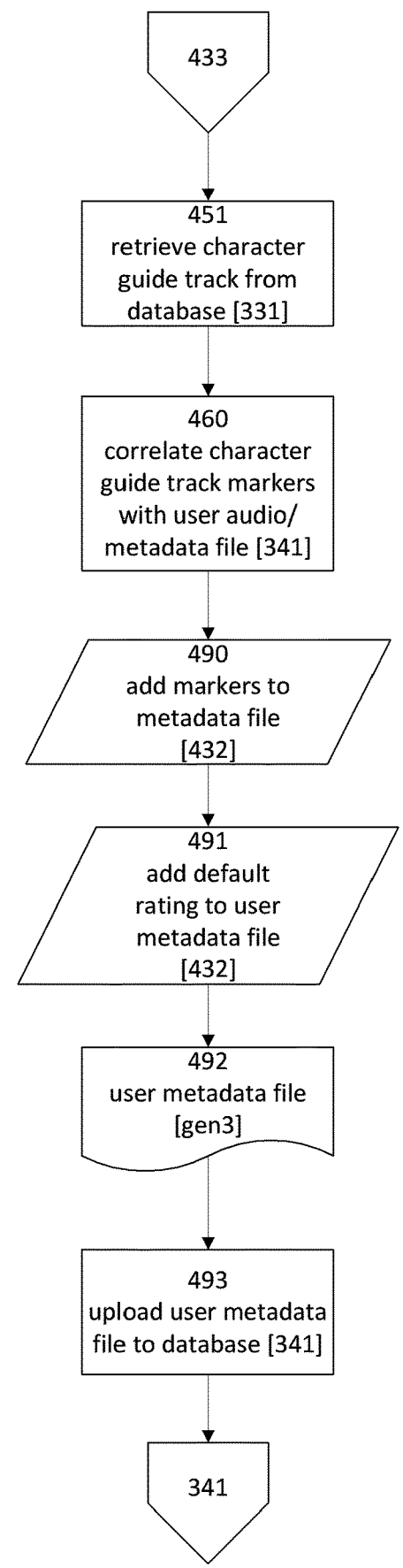
FIG. 10 illustrates a workflow to generate user media asset alignment metadata to correlate media asset tags for user generated media assets with media asset tags within an associated program template.

FIG. 10 illustrates a workflow involved to create further metadata that is associated with and defines media asset (e.g., audio) attributes based on the content of User Generated Track Recording 432, including but not limited to the recorded dialogue, and within that dialogue the paragraphs, sentences, words, and syllables, and correlates that metadata with the metadata of the associated Character Guide Track. Once generated, this metadata can be embedded into or otherwise associated with the User Generated Track Recording 432 and/or an independent library and/or database of metadata that pertains to other files in the system.

Once the User Generated Track Recording 432 has been uploaded to the media program system 12 for audio alignment processing, data for the corresponding Character Guide Track is retrieved from the database 300 [Block 451], such that audio attributes of the User Recording 430 included in User Generated Track Recording 432 can be correlated with the audio attributes of the Character Guide Track [Block 460]. Among other things, the correlation operation can be used to split the single audio file of User Recording 430 into a set of multiple user media assets. The data for the corresponding Character Guide Track can, for example, include the media files that contain the media content (e.g., digital audio waveform data) for each of the media assets that corresponds to the subject Character Guide Track, as well as the metadata attributes generated by MM module 15 in respect of such media assets. For example, in the case of Character Guide Track 1, all media assets associated with Character 1, and some or all of the associated metadata, can be retrieved from among the Script files 221, project automation metadata files 231 and project audio files 241.

Figure 11A:
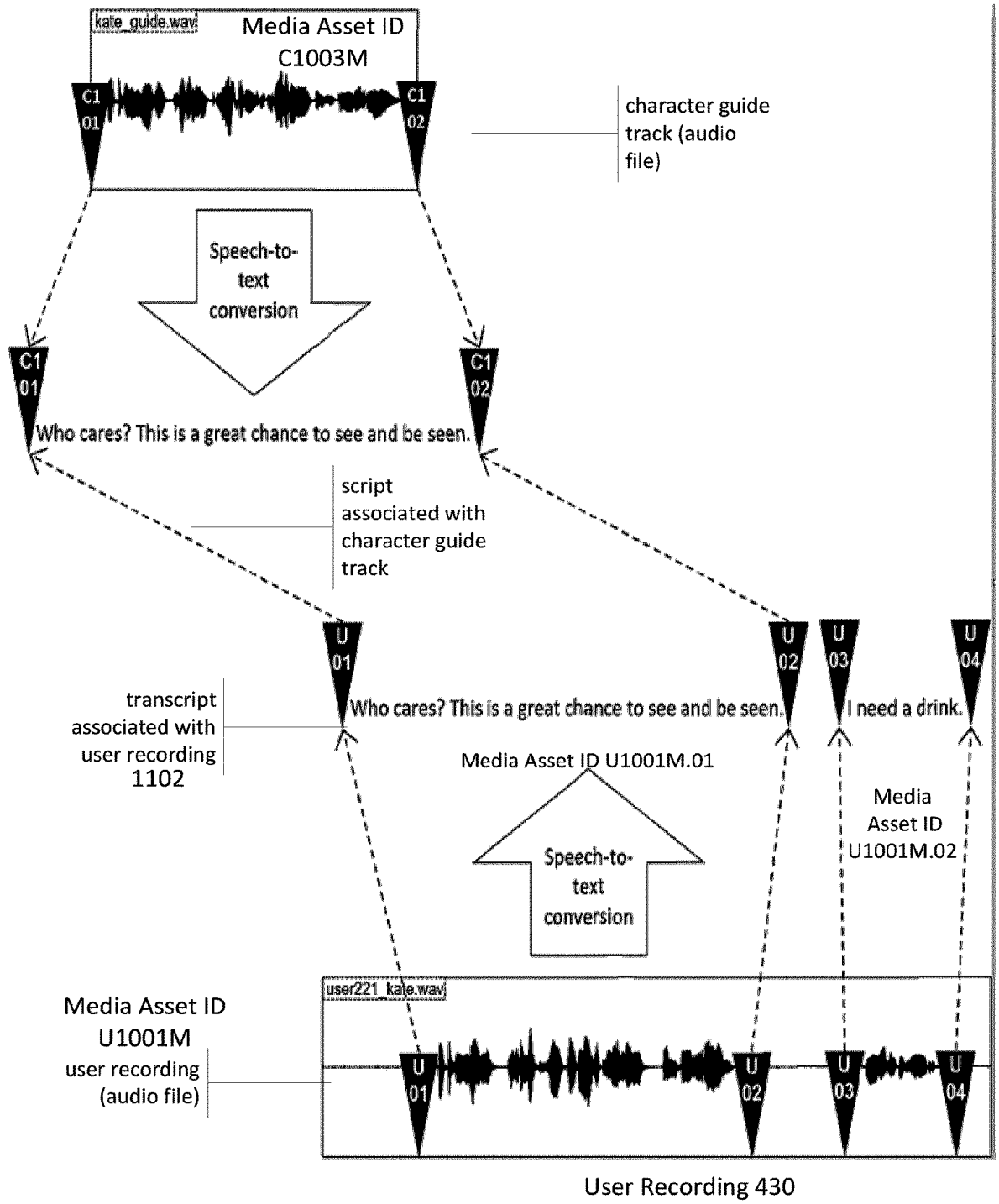
FIG. 11A graphically illustrates a process of correlating media asset tags for user generated media assets with media asset tags of an associated program template.

One example of a correlation operation [Block 460] is graphically illustrated in FIG. 11A, corresponding to the character guide track for character 1. The top portion of FIG. 11A illustrates a single dialog line media asset corresponding to Media Asset ID C1003M from the guide track for Character 1. The metadata includes a Start Tag C1.01 (Media Asset Start Tag ID C1.01) and an End Tag (Media Asset End Tag ID C1.02). The bottom portion of FIG. 11A illustrates a user recorded Media Asset (e.g., Media Asset ID U1001M) corresponding to a User Recording 430. In the illustrated example, Media Asset ID U1001M is a single file that includes all dialog lines in the user recording.

Media Program System 12 includes, or has access to, a speech-to-text conversion function to provide a text-based transcript 1102 of the User Recording 430 (bottom waveform in FIG. 11A, Media Asset ID U1001M). The text-based transcript 1102 can be compared with the text-based transcript (obtained from Database 370, generated in the process 400) for the Character Guide Track, which also correlates to that Character's lines in the Project Script 156. As indicated in FIG. 5, media asset start Tag C1.01, which represents the start of the first media asset on track 1, which corresponds to Character 1 (Kate), which is also designated as a Guide Track, correlates with the beginning of the line in the script, "Who cares? This is a great chance to see and be seen." and whereby media asset end Tag C1.02 correlates with the end of that line.

The User Recording 430 and its associated text transcription are processed by analysing the two to detect discrete dialog lines, that are then identified as discrete media assets (e.g., Media Asset ID U1001M.01 and Media Asset ID U1001M.01) and corresponding media asset start Tags and media asset end Tags can be generated to tie the respective user media assets to a timeline of the User Recording 430. These metadata Tags provide references within an audio file, shown as media asset start Tags and media asset end Tags, that identify the timing and/or waveform association of speech/dialogue components/lines.

The metadata and text transcribed from the User Recording 430 is then correlated with the original Guide Track derived text to identify and confirm mappings between the user recorded media assets and respective Guide Track Media Asset (e.g., identify and confirm Media Asset ID U1001M.01 maps to Media Asset ID C1003M). For example, in FIG. 11A, the Media Asset Start Tag U.01 identifies the point in a User Recording 430 that corresponds with the beginning of the script line, "Who cares? This is a great chance to see and be seen." Media Asset End Tag U.02 represents the end of that line in the Script and its correlating point in the audio file for User Recording 430.

In the example shown, Media Asset Start Tag C1.01 correlates with Media Asset Start Tag U.01 such that those Tags, in both the audio file and the Script, represent the beginning of Kate's line, "Who cares? This is a great chance to see and be seen." And whereby Media Asset End Tags C1.02 and U.02 correlate with the end of that line. It is likely that the audio waveform duration of the character guide track Media Asset ID C1003M and User generated Media Asset ID U1001M.01 will often be different. As will be explained in greater detail below, example embodiments are directed to an automated solution of replacing audio content of Character Guide Tracks with the content from User Recordings 430 while automatically synchronizing timing across all Tracks in the Project to account for differences in audio waveform duration between character guide track Media Assets User generated Media Assets.

In example embodiments, a default rating score can be included in the metadata generated for a User Recording 430 [Block 490]

Figure 11B:
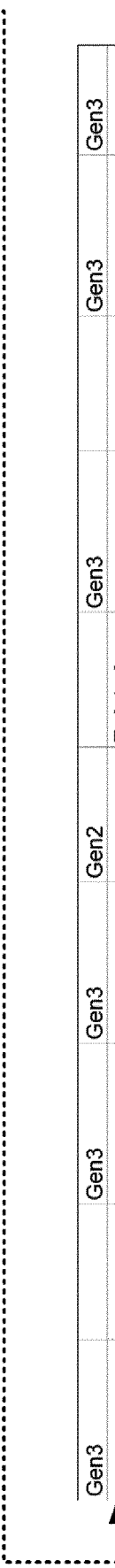
FIG. 11B shows an example of further metadata attributes generated for media assets associated with a user recording.

Once the Tags for the User Recording have been created and associated with their corresponding Character Guide Track Tags, User Generated Track Recording 432 is updated to include all the User Recording Metadata 492 and all of the discrete files that include the Media Asset content of User Recording 430. User Generated Track Recording 432 can be stored at database 370 [Block 493]. An example of User Recording Metadata 492 (also referred to a media recording metadata) that is generated automatically by correlation operation [Block 460] and default rating insertion [Block 491] for User Generated Track Recording 432 that corresponds to User Recording 430 (having an original Media Asset ID U1000M) for a further character, character 2, is illustrated in FIG. 11B. The User Recording Metadata 492 identifies each of discrete Media Assets included in the User Recording 430, and for each Media Assets includes the following set of Metadata attributes: (1) Media Asset ID; (2) Related Media Asset ID (i.e., Media Asset ID of the Project asset that the User Media Asset is intended to replace); (3) Character ID; (4) Media Asset (Audio File) Name; (5) Track ID; (6) Source Timecode In (Timecode corresponding to the point on timeline of source User Recording (e.g., original Media Asset ID U1000M) that the Media Asset starts at); (7) Source Timecode Out (Timecode corresponding to the point on timeline of source User Recording (e.g., original Media Asset ID U1000M) that the Media Asset end at); (8) Media Asset Start Tag ID (9) Related Media Asset Start Tag ID; (9) Media Asset Start Timecode (set, by default to start of the Media asset); (10) Audio Start Marker ID (assigned by Default); (11) Marker Handle Length (assigned by default (e.g., 20 frames); (12) Audio Start Marker Offset (Media Asset Start+Marker Handle Length); (13) Media Asset End Tag ID (assigned by Default); (14) Related Media Asset End Tag ID; (15) Media Asset End Time Code (Time duration of the Media Asset from Media Asset Start Timecode); (16) Audio End Marker ID; (17) Audio End Marker Offset (Media Asset End Time Code-Marker Handle Length; and (18) Default Rating.

In examples, Users of UE devices 10 have three main ways of interacting with media asset synchronization system 100: (1) Users can review Projects and User Recordings; (2) Users can rate Projects and User Recordings (described below in the context of FIG. 16); and (3) record their own User Recordings as described in respect of FIG. 8A.

In example embodiments, the MM module 15 of media program system is configured to enable User Generated Track Recordings 432 that have been uploaded to be used to replace existing Character Guide Tracks. In one example scenario, User Recordings (and thus their corresponding User Generated Track Recordings 432) can be ranked based on user ratings, with the highest User Generated Track Recordings 432 being selected to generate an Updated Program for a Project in which the guide tracks are replaced with respective user performances. In the cases where new User Generated Track Recordings 432 are being uploaded and considered on an ongoing basis, MM module 15 must update all the metadata and/or files of an existing Project on an ongoing basis as manual updating of information is not feasible.

Figure 12:
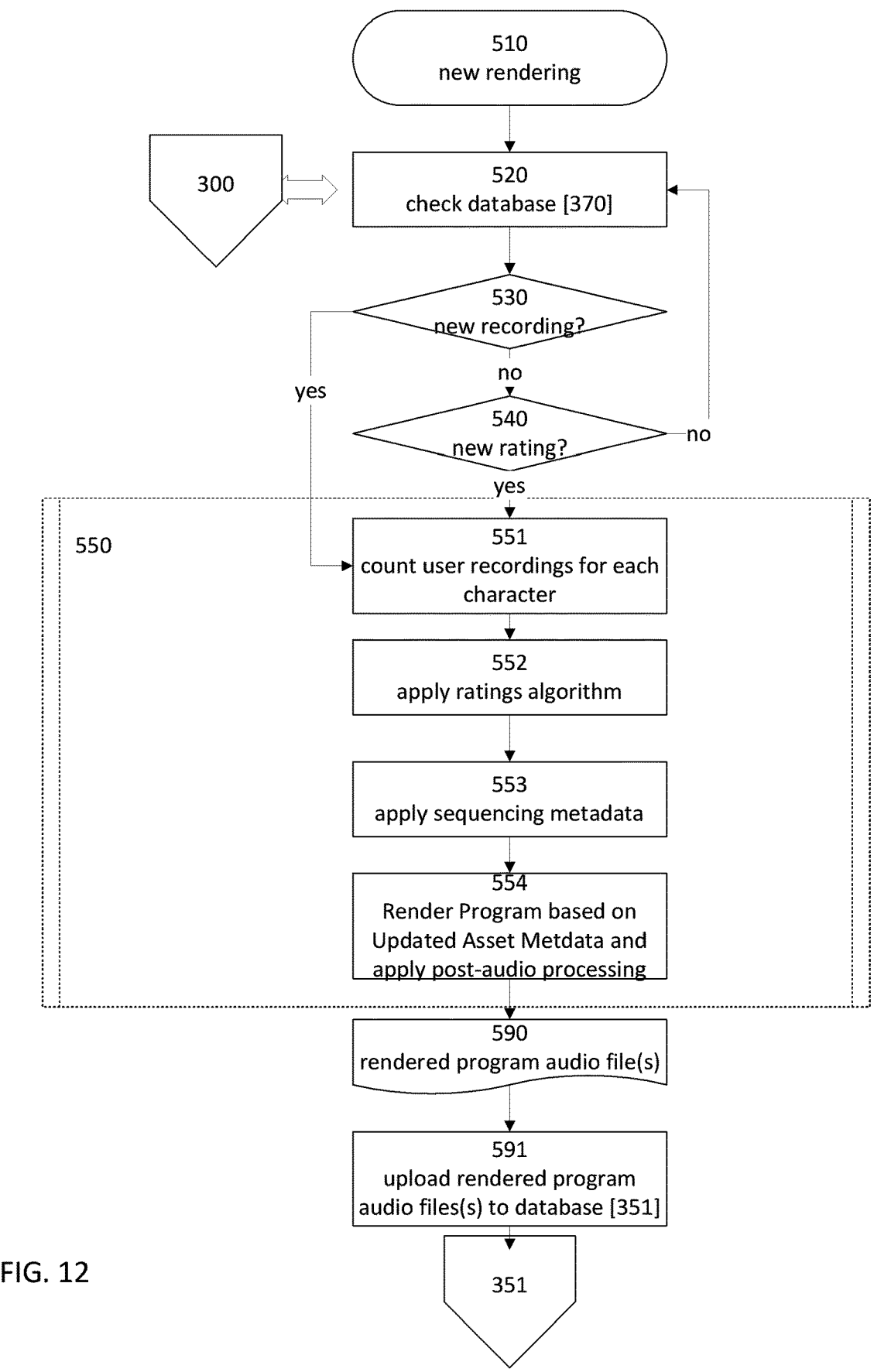
FIG. 12 illustrates a workflow to automatically create (e.g., render) a version of a completed program.

In this regard, FIG. 12 illustrates an example of a process that may be performed by MM module 15 to create one or more updated versions of a Program containing User Recordings of different Characters. Each completed, updated version of a Program is referred to herein as a Rendered Program. A Rendered Program includes, in a defined format, all the data needed for a media playback device (for example UE 10) to allow a user to consume (e.g., listen to, in the case of audio assets) the media assets that are included in the Rendered Program.

The process [Block 510] of FIG. 12 may, in various embodiments, be triggered in a number of ways, including for example, a periodic time based trigger (e.g., passing of 24 hours since last process run), a manual trigger, occurrence of a predetermined event (e.g., threshold number of new User Recordings being uploaded), etc.

In one trigger based example, MM module 15 periodically checks for new User Generated Track Recordings 432 (which, as noted above, correspond to new User Recordings 430) [Block 530]. If there are no new User Recordings, the MM module 15 can then check for new ratings (Ratings) of previously uploaded User Recordings [Block 540]. If there are one or more new Ratings, a new Rendering Process is activated, described below. If there are no new Ratings and no new User Recordings, the loop repeats [Block 520] until a next periodic timing interval where the database is compared to its last known state.

If there is one or more new User Recording(s) and/or one or more Ratings, a Selecting, Synchronizing and Rendering Process 550 is activated, whereby one or more versions of a Rendered Program(s) (e.g., versions of Media Program, 150) is/are created.

The purpose of the Process 550 is to create one or more Rendered Programs. Each Rendered Program 550 is a finished audio program based on one or more different User Recordings, enabling selected User Recordings to be showcased within a finished audio program.

In the example shown, the Process 550 entails four general steps:

The first step [Block 551] in the Process 550 entails determining the number of User Recordings of each Character within each Project (Character Recordings). The largest number of Character Recordings in a Project in the examples shown below causes an equal number of Rendered Programs, which ensures that every User Recording can be included in a finished audio program.

For example, in a Project with 3 Characters, if there are 3 User Recordings for Character 1, 20 User Recordings for Character 2, and 0 User Recordings for Character 3, the Rendering Process 550 will result in 20 Rendered Programs, all of the same Project, such that each of the Character 2 User Recordings are included in Rendered Programs. Since there are no User Recordings for Character 3, the Character Guide Track will be placed in each of the Rendered Programs as the performance for Character 3. The placement of the 3. User Recordings for Character 1 will be determined based on a rating algorithm, described below.

The second step [Block 552] in the Process 550 entails applying (reading and/or writing, as required) a rating algorithm (Rating Algorithm) to the metadata associated with all User Recordings in file directory 341, and the metadata associated with all Character Guide Tracks in file directory 331.

The Rating Algorithm is used to group User Recordings together, such that Rendered Programs contain one or more User Recordings of different characters, and/or Character Guide Tracks as required, that are suited to that group. For example, User Recordings may be grouped by similar rating, such that the highest rated User Recordings are grouped together, resulting in a Rendered Program that features a cast of the "highest rated" performances, an example of which is shown in FIG. 13.

When a new User Recording is uploaded, its current rating is the default rating assigned to the User Recording Metadata 492. When a Rater rates that User Recording, a new rating is assigned to its associated User Recording Metadata 492 in accordance with the Rating Algorithm. Therefore, the current rating of each User Recording, by way of example, may be the average of all the ratings of that User Recording, should the Rating Algorithm be a basic averaging calculation.

As more User Recordings are added to the server/database, and more ratings are applied to the metadata of those User Recordings, all the User Recordings in the system can be sorted by rating (e.g., highest to lowest), and selected for grouping into Rendered Programs accordingly.

The third step [Block 553] in the Process 550 entails applying Project Automation Metadata 231 to generate updated Asset Metadata 241A that synchronizes all relevant Media Assets that are to be included in the Program Rendering, such that each Media Asset (including those corresponding to User Recordings) are placed in accordance with the sequencing instructions provided by the Project Automation Metadata 231, resulting in tracks organized as shown graphically in FIG. 6. In other words, this step [Block 553] effectively provides updated Asset Metadata 241A that replaces Character Guide Tracks within a Project with User Recordings of the same Character within the Project, resulting in updated Asset Metadata 241A that can then be applied to generate one or more Rendered Projects as described above.

For further clarity, the sequencing instructions provided by the Project Automation Metadata 231 ensures the relative timing of all the audio files (e.g., Media Assets) in the Project, including the User Recordings 430, remains intact and in accordance with the Project Automation Metadata 231, regardless of the speed and/or duration of each User Recording 430 or parts thereof.

The fourth step [Block 554] in the Rendering Process entails rendering one or more Rendered Program(s) that corresponds to respective sets of updated Asset Metadata 241A, and applying Post Audio Processing, as described above, to all of or certain sections of the User Recordings and/or Character Guide Tracks and/or any audio files within the server, as known in the art. For example, the Project may contain automation instructions for adjusting the volume and/or other audio characteristics, including but not limited to adding reverb and/or reducing ambient noise to a certain section within a User Recording.

The completion of Rendering Process 550 results in the creation of multiple audio files containing User Recordings combined with other User Recordings, and/or Guide Tracks in cases where there are no suitable User Recordings, that each is a respective Rendered Program 590 of a version of the original Media Program 150. The Rendered Programs 590 can be saved to database 351 [Block 591].

FIG. 13 illustrates an example scenario, in three parts (A, B, and C), to demonstrate how the Program Rendering Process creates Rendered Program Audio Files. Table A represents a list of audio files that have been recorded into the system. The columns represent metadata associated with and/or embedded into each audio file. From left-to-right, the first column represents a unique file ID that is generated and assigned to each audio file to ensure each audio file has its own distinct identifier compared to any other audio file in the system; the second column represents the User that recorded the file; the third column represents the Project, which in this case is based on the script from "The Wizard of Oz"; the fourth column represents the character within the Project that the User recorded; the fifth column represents an identifier enabling the audio file to be identified as a Character Guide Track or a User Recording; the sixth-column represents the version number of the User Recording, in the case where multiple versions of the same character are recorded by the same User; and, the seventh column represents the current rating of the audio file.

In scenario "A", there are 5 User Recordings for the same Project that have been uploaded to the server/database, each recorded by a different User, each a different character, and each recorded as a Character Guide Track at the new project creation stage [i.e., at Block 102, FIG. 1]. In the example shown, the default rating assigned at [Block 491] to the Character Guide Tracks is set to 3.9 out of 5.

The tables to the immediate right of the audio file tables for scenarios A, B and C represent different possible User Recording groups that can be used for Rendered Program versions. Each User Recording is represented by its unique file ID (e.g., User Recording Media Asset ID). In the example shown, the possible User Recording groups corresponding to different Rendered Program versions are grouped from left-to-right as highest-rated to lowest-rated, with the highest-rated User Recordings being assigned to the leftmost grouping. In some examples a Rendered Program can be generated for each of the illustrated User Recording groupings. In some examples a Rendered Program can be generated only for the highest ranked of the User Recording groupings.

Since Scenario A consists of only Character Guide Tracks, the largest number of Character recordings is 1, resulting in the creation of 1 Rendered Program with each of the Character Guide Track assigned to each Character. Since the rating of each audio file is the same default rating, there are no groupings required. In this case, when the sequencing metadata is applied to all the audio files in the Project at this stage, the Rendered Program would be equivalent to the original project template.

In scenario "B", the table on the left shows that one new User Recording has been added to the server/database. The unique file ID (i.e., User Recording Media Asset ID) is ID.015, and it is identified as corresponding to the character Dorothy. In the example shown, User Recording Media Asset ID.015 has also been rated by another User, or other person, who has given a rating of 5.0.

With the addition of one new User Recording, the largest number of Character recordings is 2, resulting in the possibility of 2 Rendered Programs, whereby the placement of the new User Recording ID.015 into a Rendered Program is relative to the Rating Algorithm applied. The table to the immediate right represents the number of potential Rendered Program versions for scenario "B", grouped from left-to-right as highest-rated to lowest-rated audio files. In other words, the highest rated audio files appear in User Recording group 1 (column 1), and the lowest rated audio files appear in User Recording group 2 (column 2). In this case, when the sequencing metadata is applied to all the audio files in the Project at this stage, the table shows that audio file ID.015 is grouped in the first/leftmost group along with the remaining Character Guide Tracks, and the second/rightmost group only contains Character Guide Tracks.

In scenario "C", the table on the left shows that three additional User Recordings have been added to the server/database. Their unique Media Asset IDs are: ID.016, which is a User Recording of the character Tin Man; ID.017, which is a second User Recording of the character Dorothy; and ID.018, which is a User Recording of the character Lion.

In the example shown, ID.015, the first User Recording of the character Dorothy, has now received four ratings (not shown), two ratings of 5.0 and two ratings of 4.0, the cumulation of which has resulted in an average rating of 4.5, the metadata for which is updated accordingly, as shown in the table. Also, in the example shown, ID.016, the first User Recording of the character Tin Man, has received one rating of 4.0, the metadata for which is updated accordingly, as shown in the table. Similarly, ID.017, the second User Recording of the character Dorothy, has received one rating of 3.0, the metadata for which is updated accordingly, as shown in the table. And, ID.017, the first User Recording of the character Lion, has not received a rating and therefore the default rating is 0.0, the metadata for which is updated accordingly, as shown in the table.

With the addition of these three User Recordings, now four User Recordings in total, the largest number of Character recordings is 3. In other words, the character Dorothy has been recorded the most times—3 times in total, represented by ID.001, the Character Guide Track with a current default rating of 3.9; ID.015, the first User Recording of the character Dorothy with a current rating of 4.5; and ID.018, the second User Recording of the character Dorothy with a current rating of 3.0.

Since the largest number of Character Recordings is 3, 3 Rendered Programs are considered, whereby the placement of the new User Recordings into the Rendered Programs under consideration is relative to the Rating Algorithm applied. The table to the immediate right represents the number of possible User Recording groupings for scenario "C", grouped using the same Rating Algorithm as for scenario "B". In this case, when the sequencing metadata is applied to all the User Recordings in the Project at this stage, the table shows that ID.015 and ID.016, being the highest rated Character Recordings available, are grouped with the first set of User Recordings (column 1) representing the "highest rated" version of the Project. In the illustrated example, the first/highest rated group of User Recordings does not contain the User Recording of Lion ID.018 because this User Recording has yet to be rated and according to the Rating Algorithm used in this embodiment, unrated User Recordings default to a rating of 0.0 (rather than 3.9 as described above), which would not be fitting to be grouped with the highest-rated recordings.

The second set of User Recordings (column 2) for Scenario C contains ID.018, the unrated User Recording of Lion along with the Character Guide Tracks. The third set of User Recordings (column 3) contains ID.017, the second User Recording of Dorothy with a rating of 3.0 along with the Character Guide Tracks. The Rating Algorithm (not shown) determines that since the rating of 3.0 is lower than the default Character Guide Track rating of 3.9, it should not be grouped with the unrated User Recording ID.018.

In each of these scenarios A, B and C, all available User Recordings for a project can be included within at least one Rendered Program, such that a finished Rendered Program can be made available to each User for showcasing purposes. In some examples, after a certain period of time, the highest rated Rendered Program can be identified as the winners of a competition, and published accordingly.

Figure 14:
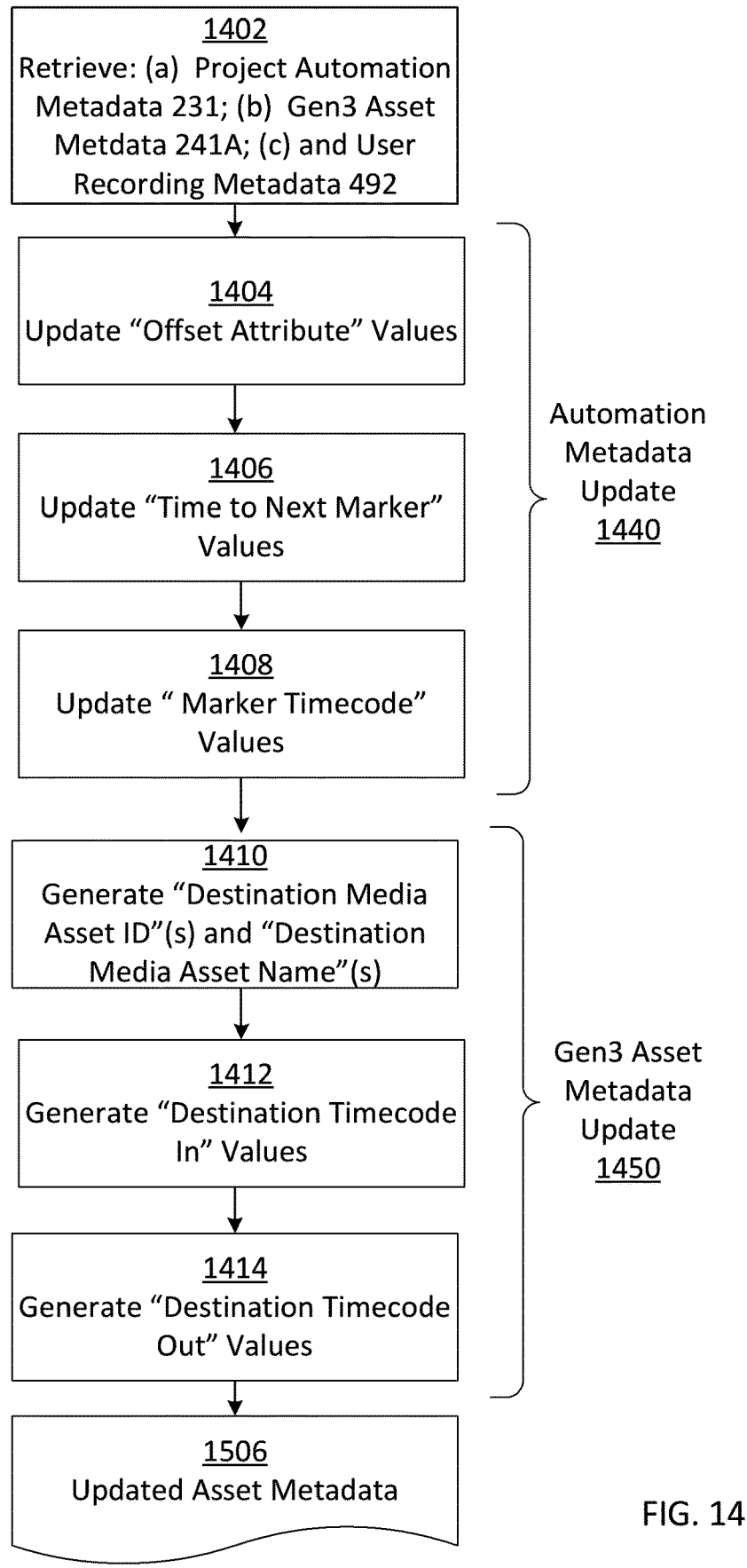
FIG. 14 shows an example workflow for synchronizing a new user recording with an existing program to generate a new version of Gen3 asset metadata attributes that can be used to render a new program version.

With reference to FIGS. 14, 15A and 15B, additional details will be provided in respect of the third step [Block 553] in the Rendering Process 550, which as noted above, entails applying Project Automation Metadata 231 to synchronize all relevant Media Assets that are to be included in a new Program Rendering. The output of Block 553 is an updated set of Asset Metadata 241A that can then be applied by a program rending operation 554 to generate a final mixed audio file that is ready for playback by an end user. FIG. 14 provides an example of an automated synchronization process 1400 that may be performed by MM module 15 as part of the "Apply Sequencing Metadata operation" [Block 553]. FIGS. 15A and 15B indicate metadata updates for a specific example of replacing the Character Guide Track 3 for Character 3 with a media assets from a User Recording for Character 3.

Referring to FIG. 14, MM module 15 is configured to retrieve any required metadata corresponding to the Project that it does not have readily accessible, including (a) Project Automation Metadata 231; (b) Gen3 Asset Metadata 241A; (c) and User Recording Metadata 492 [Block 1402]. If any of this Metadata is not available, MM module 15 can invoke one or more of metadata generation processes described above to have the required Metadata made available.

The automated synchronization process 1400 includes two main components, namely a process 1440 for updating the Project Automation Metadata 231, and a process 1450 for updating the Gen3 Asset Metadata 241A, thereby enabling a new Program Rendering to be generated. A worksheet level illustration of sample data corresponding to an example of process 1440 for updating the Project Automation Metadata 231 is shown in FIG. 15A in the context of the example data previously described in the context of FIG. 7B (Project automation metadata 231) and 11B (User Recording Metadata 492). A further worksheet level illustration of sample data corresponding to an example of process 1450 for updating the Gen3 Asset Metadata 241A is shown in FIG. 15B in the context of the example data previously described in the context of FIG. 7C (Gen3 Asset Metadata 241A) and 11B (User Recording Metadata 492).

In an example embodiment, process 1440 is configured to sequentially consider each discrete Marker that is identified in the Project automation metadata 231 in a sequential order to determine if the Marker corresponds to (e.g., is used to Mark) a media asset that will be replaced by a respective Media Asset from the new User Recording, and if so, update the "Offset Attribute" value [Block 1404], "Time to Next Marker Value" [Block 1406] and "Marker Timecode" value [Block 1408] as required to compensate for changes in relative timing of the replacement Media Asset relative to the existing Media Asset.

Referring to the example data shown in FIG. 15A, the Markers that are anchored to Media Assets that are present in Character 2 Guide Track are marked in pairs by dashed rectangles 1504, and include: Marker ID F04 (which is anchored to Character 2 Media Asset ID C2002M), Marker ID F05 (which is also anchored to Character 2 Media Asset ID C2002M); Marker ID T09 (anchored to Character 2 Media Asset ID C2005M); Marker ID F10 (anchored to Character 2 Media Asset ID C2005M); Marker ID T15 (which is anchored to Character 2 Media Asset ID C2008M); and Marker ID F16 (which is anchored to Character 2 Media Asset ID C2008M). As graphically illustrated in FIG. 6, these Markers are all of the non-phantom Markers that have been assigned to the Character 2 Track.

Regarding the "Updated Offset" values, as represented in FIG. 15A, the Updated Offset Values for all of the Markers that are not anchored to Media Assets being replaced will be identical to the Offset values for such Markers in the Original Project Automation metadata 231 (e.g., the Offset values shown in FIG. 7B). For the Markers that are anchored to those Media Assets that are being replaced, (i.e., those Markers located in Media Assets within a Character Track that is being replaced), the Updated Offset value is set as follows: for Audio Start Type Markers, the Updated Offset value will be set to the "Audio Start Marker Offset" value for the corresponding Media Asset in the User Recording Metadata 492; for Audio End Type Markers, the Updated Offset value will be set to the "Audio End Marker Offset" value for the corresponding Media Asset in the User Recording Metadata 492.

Regarding the "Updated Time to Next Marker" values, as represented in FIG. 15A, the "Updated Time to Next Marker" values for all of the Markers that are not anchored to Media Assets being replaced will be identical to the "Time to Next Marker" values of such Markers in the Original Project Automation metadata 231. For the Markers that are anchored to those Media Assets that are being replaced (i.e., those Markers located in Media Assets within a Character Track that is being replaced), the Updated Offset type will be set as follows: for Audio Start Type Markers, the "Updated Time to Next Marker" value will be set to the difference of the Updated Offset value for that marker and the Updated Offset Value for the Audio End Marker that follows the Audio Start Marker the corresponding Media Asset (e.g., in the case of Marker ID F04, the "Updated Time to Next Marker" value=00:00:03:05 minus 00:00:00:20=00:00:02:15); for Audio End Type Markers, the "Updated Time to Next Marker" value will be set to the same "Time to Next Marker" value that exists for the existing Marker (e.g., in the case of Marker ID F05, the "Updated Time to Next Marker" value=00:00:00:20, the same as in Project Automation metadata 231. It will be recognized that the changed "Updated Time to Next Marker" value for the Audio Start Marker in the above example indicates that the Media Asset ID U1000M.01 has a longer duration than the Media Asset ID C2002M that it is replacing.

Regarding the "Updated Marker Timecode" values, such values correspond to the Marker "Program Timecodes" of Project Automation Metadata of FIG. 7B. The Marker Timecode values are set based on the occurrence of the Marker relative to the Project Timeline 502, and accordingly all Marker Timecode values that occur in the timeline following a new Media Asset that has replaced an existing Media Asset of different duration will need to be replaced. In this regard, the Updated Marker Time Code for each Marker is set as follows: For a Program Start Class Marker, the Updated Marker Time Code value is set to its original Marker Timecode value; for all other classes of Marker, the Updated Marker Time Code value is set to the sum of the updated Marker Timecode and Updated Time to Next Marker values for the previous Marker in the sequence. Thus, the Updated Marker Time Code values represent an absolute repositioning of the Media Assets along the Project Timeline based on changes of duration that occur within a discrete Media Asset when an existing Media Asset in the project sequence is replaced with a new Media Asset.

Turning now to Gen3 Asset Metadata Update 1450 (Including operations 1419, 1412, 1414 that output updated asset metadata 1506), an example of which is illustrated in FIG. 15B, the "Original Timecode In", "Original Timecode Out" and "Original Length" values correspond respectively to the "Program Timecode In", "Program Timecode Out", and "Length" values shown in FIG. 7C, and are set absolute timecode values that link the subject Media Asset to the project timeline. In this regard, the "Destination Timecode In" values for each Media Asset are computed based on the metadata attributes associated with the Audio Start Marker that is associated with that Media Asset. In particular, the "Destination Timecode In" value for a Media Asset is equal to the "Updated Marker Time Code" value assigned to the Audio Start Marker for that Media Asset minus the "Updated Offset" value for that same Audio Start Marker.

The "Destination Timecode Out" values for each Media Asset are determined based on the sum of the "Destination Timecode In" value plus the Original Length of the Media Asset, if the Media Asset is not being replaced, and the sum of "Destination Time Code In" value plus the "Media Asset End" value form User Recording Metadata 492 in the case of a newly inserted Media Asset.

"Destination Length" can be determined for each Media Asset based on the difference between the Timecode in and out values.

The updated metadata can then be used by a rendering process (Block 1416) and/or post-audio processing [Block 554] to provide Rendered Program 590 in which the relative locations of all audio waveforms within the program are adjusted automatically to account for any changes in the lengths of individual media elements.

In at least some examples, the location of Trigger Point Markers such as F.12 can be automatically adjusted based on the pattern of the waveform around them. For example, MM Module 15 may be configured to recognize that trigger Point Marker F.12 is located in a low amplitude region between two higher amplitude regions, and thus position trigger Point Marker F.12 in a similar relative location within a new Media Asset that is introduced to replace the existing Media Asset Mona_guide3.wav. This will ensure that the door close sound effect occurs at the correct location within the new media asset playback.

Figure 16:
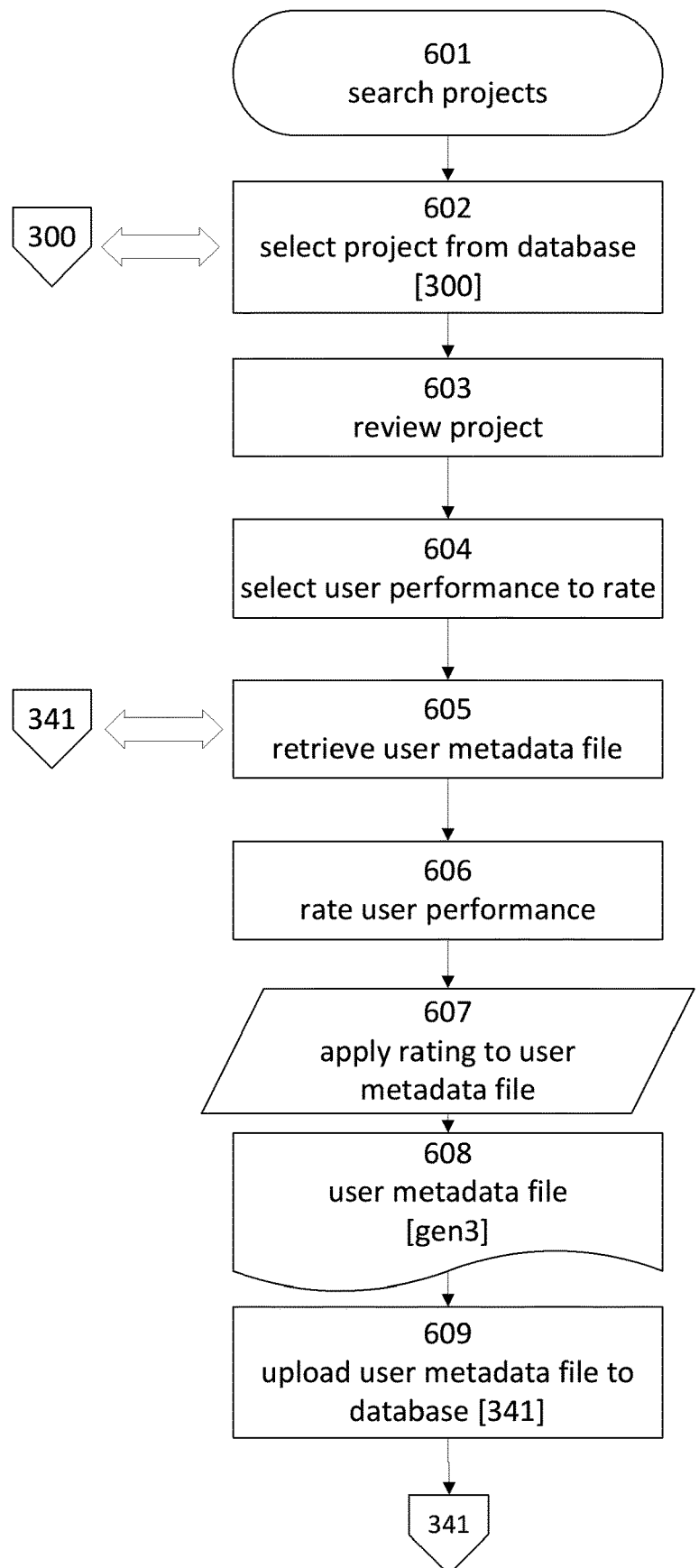
FIG. 16 illustrates a workflow for rating user performances.

FIG. 16 illustrates an example of the general steps involved for User Recordings to be rated by other Users (Raters) on a certain predetermined scale by means of interacting with the UE device 10. A search for performances to rate begins with a database 370 search for a Project that contains at least one User Recording [Block 601]. The search may be activated manually by the Rater or automatically based on criteria relative to the Rater, User Recordings, Projects, and/or information derived from any metadata within the system.

A Project containing at least one User Recording is selected from the server and/or database [Block 602], which may occur by a manual or automated selection process. The Rater reviews a User Recording within the Project, which may or may not be combined with other User Recordings in the same Project [Block 603]. This review process entails listening to the Project or a section of the Project that contains at least one User Recording or a sample section thereof.

A User Recording is selected for the Rater to rate [Block 604] (e.g., on a 1-5 scale, 1 being substandard and 5 being excellent), the process for which may be activated manually by the Rater or automatically based on criteria relative to the Rater, User Recording, Project, and/or information derived from any relevant metadata within the system 100.

Once the User Recording is selected, the metadata related to that User Recording is retrieved from the server and/or database [Block 605], such that it can be modified based on the rating of that User Performance provided by the Rater. The metadata contains rating information relating to the User Recording, which may be an average of all the ratings provided by previous Raters, the default rating [As assigned in Block 491] or another rating calculation algorithm, as known in the art.

The Rater inputs their rating of the User Recording through an interface of the UE device 10 [Block 606], which is applied at Server 300 to the metadata such that the User Recording metadata reflects a rating that now incorporates the new rating input by the Rater [Block 607], the result of which is an updated metadata file associated with and/or embedded into the User Recording audio file [Block 608], which is then uploaded to or updated at the server and/or database [Block 609].

Though not shown in the diagrams, Projects, scripts and/or related attributes therefor can be rated using this same process as well. Furthermore, User Recordings, Projects, scripts, and/or related attributes therefor can also be rated by means of extracting other relevant data from the process. For example, the rating metadata of a Program can be impacted based on engagement. More specifically, as an example, a Program can achieve a higher rating the more Users upload User Recordings for that Program. As another example, a Program can achieve a rating based on the average overall time spent by Users interacting with that Program.

Although described above in the context of Audio programs, the systems and methods described above could also be applied to video. For example, Markers can be used to link audio assets to an animation. In the event that the length of an audio asset is lengthened or reduced, the corresponding animation action can also be changed (e.g., stop animated lip movement or start it at a different time).

The sequencing system 100 enables a system in which media assets within a program are triggered by other media assets within the program to perform a relative asset sequencing operation. In an example embodiment, a user records a performance into a recording device which is uploaded to a server. The system compares the uploaded media asset to the existing media assets on the server, and creates sequencing instructions, known as an edit decision list, based on correlating data between the uploaded media asset metadata and its associated media asset metadata on the server. Using the instructions of the edit decision list, the system then dynamically inserts the sections of the uploaded media asset into their corresponding locations within the program to replace the existing associated media asset, such that the pacing or timing of performances do not affect the trigger timing of each media asset in the program.

In some embodiments, the system and method of using a relative, trigger-based sequencing system for media assets is deployed to automate the curation of the highest-rated talent to perform in an audio program. The system and method enables amateur, aspiring, and professional voice performers to showcase their talent within a scripted audio program. The performances are rated by a community of users (or other rating group), and the highest rated performances are grouped together, such that after a time period, the final program can be published with the highest rated performances.

In one example, the first step of the process entails the creation and production of a completed, recorded audio program, produced in accordance with current standard industry procedures. The completed audio program contains two main components: 1) a set of audio files, related events, and the absolute sequencing data therefor; and 2) an accompanying script on which the recordings are based. The two components are then uploaded to a data processor where they are associated with one another, such that each audio asset corelates with each script part. The completion of this step forms a program template, which serves as the basis on which the relative sequencing system is created. Using a suitably configured device, a producer adds markers to the script and audio components of the template, each marker representing a trigger action. The collection of markers form the basis of the relative trigger-based sequencing instructions, such that each event is triggered by other events rather than an absolute position in the timeline. The relative trigger-based sequencing data is then uploaded to the server for later processing. Once the program template is complete and available for use, a user can select it from a directory of programs accessible via a software application loaded onto a mobile device. At this stage in the process, the program setup phase is complete, and ready for user interaction.

Prior to recording a performance, a user reviews scripts and/or performances in order to select a program that suits their preference. Similarly, a user reviews performances in order to rate them. The user can browse for scripts, or search by applying filters such as character age and gender, and story length and genre. A user may also browse through programs for leisure.

To record a performance, a user selects a script, and the character they wish to perform. With the script and character selected, the user records their voice performance of the selected part either directly via an app on their mobile device, or by using an alternate recording device, and uploads the finished audio file to the server.

The audio file is then compared with the existing recording of the selected character from the program template by means of an automated process where speech in the user audio file correlates to the speech in the existing template recording using speech-to-text and text-to-speech processing software, as known in the art.

The completed comparison process results in metadata that is associated with or applied to the user audio file, such that the markers created previously for the template recordings can be used to trigger the correlating markers in the user audio file. In other words, the template audio files can be effectively replaced by corresponding user recordings, which are dynamically inserted in the finished program using the relative, trigger-based sequencing system.

At certain time intervals and on an ongoing basis, each user performance can be dynamically inserted into the fully produced program along with other user performances to form the cast of the program. Multiple versions of the program can be created automatically to accommodate a number and variety of user recordings. A unique link (e.g., URL) to the user's program can be shared among their community.

With user recordings uploaded to the server, the performances of those recordings are rated by a community of People (e.g., other Users of the system 100, the general public (through a web interface), group of invited critics, etc.), such that performances can be grouped and sorted by rating.

A program generator function of MM module 15 automatically assembles performances into casts for the program. As more performances are uploaded and rated, multiple versions of the same program are created. The generator applies an algorithm that continuously updates the cast of each program version on an ongoing basis, the results of which are dependent on the algorithm applied.

A URL can point to a website that contains the program that contains the user's recording, such that the user can showcase their performance. The URL originally provided to a user's program can always connect to that user's current program version or other program versions depending on the user's account preferences and/or rating algorithm applied.

After a time period, the program version with the highest rated performances is published as part of a series of programs, and distributed on a variety of platforms, included but not limited to podcast platforms worldwide.

In example embodiments, replacement Character Track Media Assets may include different content than what they are replacing. For example, a User may stray from the script and improvise on one or more dialog lines. This can allow User specific dialog variations to be introduced to new rendered program versions.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The invention claimed is:

1. An automated, computer implemented method for processing a media program that comprises multiple tracks, each of the tracks including one or more original media assets that are arranged relative to a reference timeline, the method comprising:
computing automation metadata for the media program that includes, for each of the original media assets, timecode data indicating relative playback timing for a sequence of the original media assets;
receiving a media recording corresponding to a track of the media program, the media recording including one or more replacement media assets to replace corresponding original media assets included on the corresponding track of the media program;
computing media recording metadata for the received media recording that includes, for each of the one or more replacement media assets, timecode data indicating a duration of the replacement media asset;
generating, based on the automation metadata and the media recording metadata, playback sequence data that includes a list of the original media assets that have not been replaced together with the one or more replacement media assets, the playback sequence data indicating a playback sequence order and playback timecodes that preserve a respective timing of the original and replacement media assets between the media program and a new version of the media program; and
rendering, based on the playback sequence data, the new version of the media program.

2. The method of claim 1 wherein at least one replacement media asset has a playback duration that is different than that of the corresponding original media asset that it replaces, and at least some of the original media assets in the sequence of media assets are shifted relative to the reference timeline in the new version of the media program.

3. The method of claim 1 wherein:
the automation metadata comprises a plurality of timecode-based markers, including asset markers, the asset markers each having a respective set of asset marker attributes including: (a) a marker ID; (b) a Media Asset ID identifying, from the original media assets, a media asset that the media asset corresponds to; (c) an other marker ID that indicates a further marker that the asset marker has a triggering relationship with; and (d) a next marker timecode that indicates a time between the asset marker and another marker, and
generating the playback sequence data comprises: computing updated next marker timecodes for all of the asset markers to reflect replacement of the original media assets that correspond to the replacement media assets.

4. A method according to claim 3 wherein the asset marker attributes for each asset marker include: (e) an offset timecode that indicates an offset of the asset marker from a start of the media asset that the asset marker corresponds to; and (f) a program timecode that indicates a position of the asset marker relative to the reference timeline,
wherein generating the playback sequence data comprises computing updated program timecodes for the asset markers and updating offset timecodes for asset markers that correspond to original media assets being replaced with offset timecodes determined in respect of the corresponding replacement media assets.

5. A method of claim 4 wherein media asset markers include start markers that mark a start of media content within the media asset that the media asset marker corresponds to and end markers that mark an end of media content within the media asset that the media asset marker corresponds to,
wherein generating the playback sequence data comprises:
computing, for media assets of the new version of the media program, respective playback timecodes that refer to a new media program reference timeline for the new media program, the playback timecodes including an "In" asset timecode and an "Out" asset timecode indicating respective start and end times for playback of the media asset relative to a new media program reference timeline;
wherein the "In" asset timecode for a media asset is based on the program timecode and the offset timecode for a start marker corresponding to the media asset and the "Out" asset timecode for a media asset is based on the program timecode and an offset timecode for an end marker corresponding to the media asset.

6. The method of claim 3 wherein the asset markers include one or more trigger markers that function as trigger points for indicating respective media assets in tracks that the trigger markers are not located in.

7. The method of claim 3 comprising:
generating a user interface on a display of a computing device that displays a graphical representation of the original media assets of the multiple tracks of the media program along a representation of the reference timeline; and generating the asset marker attributes based on placement of visual representations of the asset markers on the graphical representation in response to user input to the computing device.

8. The method of claim 1 wherein at least some of the tracks of the media program are character tracks that each correspond to a respective character, and the original media assets included in the character tracks each include digital audio waveform data corresponding to a respective spoken line of dialog, wherein the media recording corresponds to one of the character tracks and the one or more replacement media assets each include digital audio waveform data corresponding to a respective spoken line of dialog.

9. The method of claim 1 comprising performing speech to text conversion on a replacement media asset and the corresponding original media asset to obtain respective text conversions thereof and comparing the respective text conversions to confirm a correlation between the replacement media asset and the corresponding original media asset.

10. The method of claim 1 comprising aligning metadata generated with a text script for the media program with metadata generated in respect of the original media assets to validate the metadata generated in respect of the original media assets.

11. The method of claim 1 comprising:
receiving multiple further versions of the media recording corresponding the track of the media program, the further media recordings each including one or more replacement media assets to replace corresponding original media assets included on the corresponding track of the media program;
computing respective media recording metadata for the further media recordings that includes;
generating, based on the automation metadata and the media recording metadata computed for each of the further media recordings, playback sequence data for each of the further media recordings that includes a list of the original media assets that have not been replaced together with the one or more replacement media assets for each of the further media recordings, the playback sequence data for each of the further media recordings indicating a playback sequence order and playback timecodes that preserve a respective timing of the original and replacement media assets between the media program and respective new versions of the media program corresponding to each of the further media recordings; and rendering, based on the playback synchronization data, the new versions of the media program.

12. The method of claim 1 comprising:
receiving, through a network, voting data in respect a plurality of user recordings submitted by different uses, and selecting, based the voting data, one of the user recordings to use as the media recording.

13. A non-transitory computer readable medium storing software instructions for configuring a computer system to perform the method of claim 1.

14. A computer system comprising:
one or more processing devices; and
electronic storage in communication with the one or more processing devices and including non-transitory instructions that, when executed by the one or more processing device configure the computer system to:

compute automation metadata for a media program that comprises multiple tracks, each of the tracks including one or more original media assets that are arranged relative to a reference timeline, the automation metadata including, for each of the original media assets, timecode data indicating relative playback timing for a sequence of the original media assets;

compute media recording metadata for a media recording corresponding to a track of the media program, the media recording including one or more replacement media assets to replace corresponding original media assets included on the corresponding track of the media program, the media recording metadata including, for each of the one or more replacement media assets, timecode data indicating a duration of the replacement media asset;

generate, based on the automation metadata and the media recording metadata, playback sequence data that includes a list of the original media assets that have not been replaced together with the one or more replacement media assets, the playback sequence data indicating a playback sequence order and playback timecodes that preserve a respective timing of the original and replacement media assets between the media program and a new version of the media program; and render, based on the playback sequence data, the new version of the media program.

15. The system of claim 14 wherein at least one replacement media asset has a playback duration that is different than that of the corresponding original media asset that it replaces, and at least some of the original media assets in the sequence of media assets are shifted relative to the reference timeline in the new version of the media program.

16. The system of claim 14 wherein:
the automation metadata comprises a plurality of timecode-based markers, including asset markers, the asset markers each having a respective set of asset marker attributes including: (a) a marker ID; (b) a Media Asset ID identifying, from the original media assets, a media asset that the media asset corresponds to; (c) an other marker ID that indicates a further marker that the asset marker has a triggering relationship with; and (d) a next marker timecode that indicates a time between the asset marker and another marker, and
the computer system is configured to generate the playback sequence data by:
computing updated next marker timecodes for all of the asset markers to reflect replacement of the original media assets that correspond to the replacement media assets.

17. The system of claim 16 wherein the asset marker attributes for each asset marker include: (e) an offset timecode that indicates an offset of the asset marker from a start of the media asset that the asset marker corresponds to; and (f) a program timecode that indicates a position of the asset marker relative to the reference timeline,
wherein the computer system is further configured to generate the playback sequence data by computing updated program timecodes for the asset markers and updating offset timecodes for asset markers that correspond to original media assets being replaced with offset timecodes determined in respect of the corresponding replacement media assets.

18. The system of claim 17 wherein media asset markers include start markers that mark a start of media content within the media asset that the media asset marker corresponds to and end markers that mark an end of media content within the media asset that the media asset marker corresponds to, wherein the computer system is further configured the playback sequence data by:

computing, for media assets of the new version of the media program, respective playback timecodes that refer to a new media program reference timeline for the new media program, the playback timecodes including an "In" asset timecode and an "Out" asset timecode indicating respective start and end times for playback of the media asset relative to a new media program reference timeline;

wherein the "In" asset timecode for a media asset is based on the program timecode and the offset timecode for a start marker corresponding to the media asset and the "Out" asset timecode for a media asset is based on the program timecode and an offset timecode for an end marker corresponding to the media asset.

19. The computer system of claim 16 wherein the asset markers include one or more trigger markers that function as trigger points for indicating respective media assets in tracks that the trigger markers are not located in.

20. The computer system of claim 16 wherein the computer system is configured to perform operations of:

generating a user interface on a display of a computing device that displays a graphical representation of the original media assets of the multiple tracks of the media program along a representation of the reference timeline; and generating the asset marker attributes based on placement of visual representations of the asset markers on the graphical representation in response to user input to the computing device.

\* \* \* \* \*